US006799819B2

(12) United States Patent
Samii

(10) Patent No.: US 6,799,819 B2
(45) Date of Patent: Oct. 5, 2004

(54) PHOTOSENSOR ACTIVATION OF AN EJECTION ELEMENT OF A FLUID EJECTION DEVICE

(75) Inventor: Mohammad M. Samii, La Jolla, CA (US)

(73) Assignee: Hewlett-Packard Development Company, L.P., Fort Collins, CO (US)

(*) Notice: Subject to any disclaimer, the term of this patent is extended or adjusted under 35 U.S.C. 154(b) by 58 days.

(21) Appl. No.: 10/165,226

(22) Filed: Jun. 7, 2002

(65) Prior Publication Data

US 2003/0231221 A1 Dec. 18, 2003

(51) Int. Cl.[7] ........................ H04N 1/034; B41J 29/393; B41J 2/14

(52) U.S. Cl. ............................... 347/3; 347/19; 347/50; 347/51

(58) Field of Search ................................ 347/3, 19, 10, 347/14, 12, 50, 11, 23, 5, 51, 30, 29, 33, 22, 28, 4, 20, 17, 9, 68; 358/476

(56) References Cited

U.S. PATENT DOCUMENTS

| | | | | |
|---|---|---|---|---|
| 4,233,612 A | | 11/1980 | Hirayama et al. | |
| 4,321,627 A | * | 3/1982 | Hooker, III et al. | 358/476 |
| 4,513,298 A | | 4/1985 | Scheu | |

(List continued on next page.)

FOREIGN PATENT DOCUMENTS

| | | |
|---|---|---|
| EP | 0829356 A2 | 3/1998 |
| EP | 0861724 A2 | 9/1998 |
| EP | 0829356 A3 | 3/1999 |
| EP | 0861724 A3 | 10/1999 |
| EP | 1008451 A2 | 6/2000 |
| EP | 1008451 A3 | 3/2001 |
| JP | 54156634 | 10/1979 |
| JP | 02022065 | 1/1990 |
| JP | 02225049 | 9/1990 |
| JP | 04246542 | 9/1992 |
| JP | 04305483 | 10/1992 |
| JP | 05212869 | 8/1993 |
| JP | 05261927 | 10/1993 |
| JP | 08080609 | 3/1996 |
| JP | 08099417 | 4/1996 |
| JP | 11105276 | 4/1999 |
| JP | 2001353875 | 12/2001 |
| WO | WO97/29914 | 8/1997 |

OTHER PUBLICATIONS

U.S. patent application Ser. No. 10/121,012, filed Apr. 10, 2002 and entitled "Laser Triggered Inkjet Firing".
A copy of PCT International Search Report (relating to EPO Appln No. 03253465.3) mailed on Aug. 21, 2003 (4 pages).
A copy of PCT International Search Report (relating to EPO Appln No. 03253466.1) mailed on Aug. 21, 2002 (3 pages).
A copy of PCT International Search Report (relating to EPO Appln No. 03253467.9) mailed on Aug. 21, 2003 (4 pages).
"Introduction to Solid State Physics", by Charles Kittel, Seventh Edition, 1996, John Wiley & Sons, Inc.; p. 573.
"Physics of Semiconductor Devices", by Michael Shur, 1990, Prentice–Hall, Inc.; pp. 501–508.
"Semiconductor Physics and Devices", by Donald A. Neaman, Second Edition, 1997, The McGraw–Hill Companies; pp. 280–292.
"Printhead for Thermal Ink Jet Print Bar and Method of Manufacturing the Same", US patent application Ser. No. 09/772,543, filed Jan. 30, 2001.

*Primary Examiner*—Stephen D. Meier
*Assistant Examiner*—Charles W. Stewart, Jr.
(74) *Attorney, Agent, or Firm*—Hewlett-Packard Company

(57) ABSTRACT

A replaceable printer component includes an array of fluid ejection elements. Each of the fluid ejection elements is configured to cause fluid to be ejected when the fluid ejection element is activated. The component includes optical activation means for activating the fluid ejection elements based on a received light beam.

12 Claims, 14 Drawing Sheets

U.S. PATENT DOCUMENTS

| | | | |
|---|---|---|---|
| 4,535,343 | A | 8/1985 | Wright et al. |
| 4,745,416 | A | 5/1988 | Horihata |
| 4,764,776 | A | 8/1988 | Mugrauer et al. |
| 4,769,659 | A | 9/1988 | Umeda et al. |
| 4,783,149 | A | 11/1988 | Umeda et al. |
| 4,794,410 | A | 12/1988 | Taub et al. |
| 4,794,463 | A | 12/1988 | Tamura et al. |
| 4,812,859 | A | 3/1989 | Chan et al. |
| 4,847,630 | A | 7/1989 | Bhaskar et al. |
| 4,862,197 | A | 8/1989 | Stoffel |
| 4,894,664 | A | 1/1990 | Tsung Pan |
| 4,903,051 | A | 2/1990 | Egawa et al. |
| 5,021,808 | A | 6/1991 | Kohyama |
| 5,040,074 | A | 8/1991 | Stemmle |
| 5,095,376 | A | 3/1992 | Umeda et al. |
| 5,159,349 | A | 10/1992 | Endo et al. |
| 5,589,865 | A | 12/1996 | Beeson |
| 5,691,759 | A | 11/1997 | Hanson |
| 5,719,602 | A | 2/1998 | Hackleman et al. |
| 5,732,168 | A | 3/1998 | Donald |
| 5,734,394 | A | 3/1998 | Hackleman |
| 5,742,305 | A | 4/1998 | Hackleman |
| 5,745,152 | A | 4/1998 | Vincent et al. |
| 5,760,817 | A | 6/1998 | Foote |
| 5,805,296 | A | 9/1998 | Hattori |
| 5,844,588 | A | 12/1998 | Anderson |
| 5,870,132 | A | 2/1999 | Inoue et al. |
| 5,920,336 | A | 7/1999 | Lawton et al. |
| 5,929,892 | A | 7/1999 | Towner et al. |
| 5,933,184 | A | 8/1999 | Ishigami et al. |
| 5,984,464 | A | 11/1999 | Steinfield et al. |
| 5,991,055 | A | 11/1999 | Haselby et al. |
| 6,135,586 | A | 10/2000 | McClelland et al. |
| 6,266,073 | B1 | 7/2001 | Yergenson |
| 6,318,825 | B1 | 11/2001 | Carau, Sr. |
| 2002/0051031 | A1 | 5/2002 | Shin et al. |

* cited by examiner

PHOTOSENSOR ACTIVATION OF AN EJECTION ELEMENT OF A FLUID EJECTION DEVICE

THE FIELD OF THE INVENTION

The present invention relates to fluid ejection devices. More particularly, the invention relates to photosensor activation of an ejection element of a fluid ejection device.

BACKGROUND OF THE INVENTION

The art of inkjet technology is relatively well developed. Commercial products such as computer printers, graphics plotters, facsimile machines, and multi-function devices have been implemented with inkjet technology for producing printed media. Generally, an inkjet image is formed pursuant to precise placement on a print medium of ink drops emitted by an ink drop generating device known as an inkjet printhead assembly. An inkjet printhead assembly includes at least one printhead. Inkjet printers have at least one ink supply. An ink supply includes an ink container having an ink reservoir. The ink supply can be housed together with the inkjet printhead assembly, or can be housed separately. Some conventional inkjet printhead assemblies span over a limited portion of a page width, and are scanned across the page. The inkjet printhead assembly is supported on a movable carriage that traverses over the surface of the print medium and is controlled to eject drops of ink at appropriate times pursuant to command of a microcomputer or other controllers, wherein the timing of the application of the ink drops is intended to correspond to a pattern of pixels of the image being printed.

A page-wide-array (PWA) printhead assembly spans an entire pagewidth (e.g., 8.5 inches, 11 inches, A4 width) and is fixed relative to the media path. A PWA printhead assembly includes a PWA printhead with thousands of nozzles that span the entire page width. The PWA printhead assembly is typically oriented orthogonal to the paper path. During operation, the PWA printhead assembly is fixed, while the media is moved under the assembly. The PWA printhead assembly prints one or more lines at a time as the page moves relative to the assembly.

Each nozzle chamber in a PWA printhead assembly typically includes an ejection element, a chamber layer, and a substrate. When a firing resistor is used as the ejection element, the firing resistor is located within the chamber on the substrate. During operation, the nozzle chamber receives ink from an ink supply through an inlet channel. The firing resistor is then activated so as to heat the ink thereon and cause a vapor bubble to form. The vapor bubble then ejects the ink as a droplet through the nozzle, and onto a media (e.g., paper, transparency). Droplets of repeatable velocity, volume, and direction are ejected from respective nozzles to effectively imprint characters, graphics, and photographic images onto a media.

The ejection element in a PWA printhead assembly of the piezoelectric type typically includes a piezoceramic layer. The piezoceramic layer consists of a flexible wall to which is attached a piezoceramic material on the side exterior to the chamber. During operation, the nozzle chamber receives ink from an ink supply through an inlet channel. The piezoceramic material is then activated so as to deform the wall into the chamber. The pressure generated then ejects the ink as a droplet through the nozzle, and onto a media (e.g., paper, transparency). Droplets of repeatable velocity, volume, and direction are ejected from respective nozzles to effectively imprint characters, graphics, and photographic images onto a media.

Because of the large number of nozzles in a PWA printhead assembly, and because the assembly typically prints one or more page-wide lines at a time, there are substantially more timing and control signals generated at a given time than for a scanning type printhead assembly. To print multiple lines as opposed to multiple characters, the firing of thousands more nozzles has to be controlled. Signals have to be transmitted to the thousands more firing resistors of such nozzles.

In typical PWA inkjet printers, complex electronics and interconnects have been used to generate the necessary signals and route them to the appropriate locations. Some PWA inkjet printers use a flexible printed circuit ("flex circuit") attached to a printhead assembly that includes signal paths for carrying signals from a print processor to addressed firing resistors.

There is also a desire to produce reliable, high-yield, page-wide-arrays in a cost effective manner.

SUMMARY OF THE INVENTION

One form of the present invention provides a replaceable printer component including an array of fluid ejection elements. Each of the fluid ejection elements is configured to cause fluid to be ejected when the fluid ejection element is activated. The component includes optical activation means for activating the fluid ejection elements based on a received light beam.

DESCRIPTION

In the following detailed description, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

In one embodiment of the present invention, fluid ejection elements, such as inkjet elements in a page-wide-array (PWA) printhead assembly, are optically activated. In this embodiment, a light beam is modulated as the beam is scanned over the PWA printhead assembly to selectively fire desired inkjet elements, thereby generating the desired raster pattern for each of the four color planes (i.e., cyan, magenta, yellow, and black), and hence producing the desired image. In one form of the invention, a single PWA printhead assembly functions both as a printhead and an image scanner with the addition of relatively small added cost.

Figure 1:
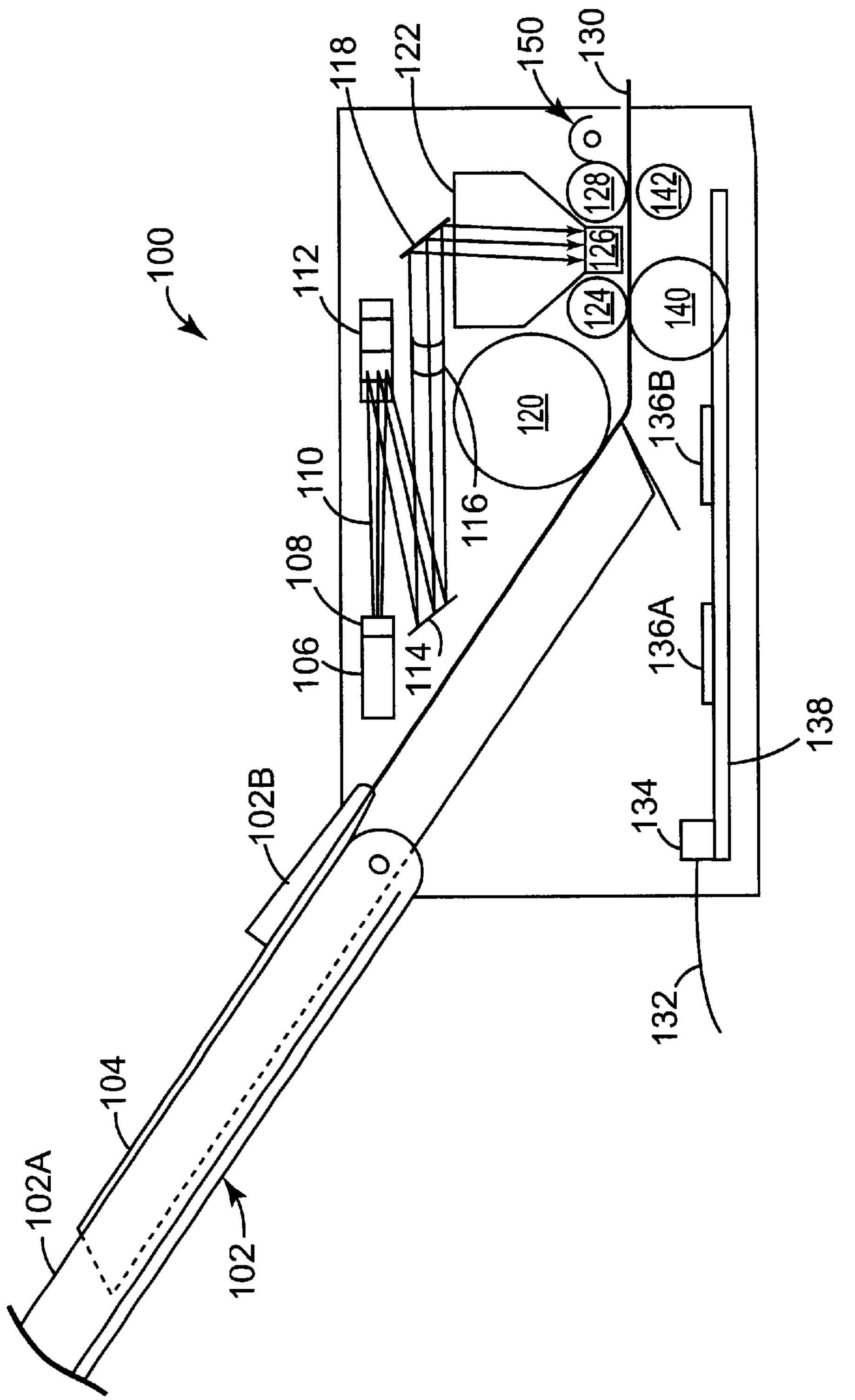
FIG. 1 is a side view of a fluid ejection and scanning device, such as a page-wide-array (PWA) inkjet printer and scanner multi-function product (MFP), illustrating major internal components of the device, according to one embodiment of the present invention.

FIG. 1 is a side view of a fluid ejection and scanning device, such as a PWA inkjet printer and scanner device, 100 illustrating major internal components of the device 100 according to one embodiment of the present invention. Device 100 includes media feeder 102 with side guides 102A and 102B, light source 106, modulator 108, rotating polygonal mirror 112, deflection mirrors 114 and 118, lens 116, fluid supplies 122, fluid ejection and scanning assembly 126, rollers 120, 124, 140, and 142, star-wheel 128, and printed circuit assembly (PCA) 138. A stack of media 104 (e.g., paper, transparencies) is held by feeder 102. In this particular embodiment, heater element 150 dries the printed media before it is ejected through a media outlet.

In one embodiment, rollers 120, 124, 140, and 142, and star-wheel 128 are part of a constant motion system that transports media by assembly 126 at a substantially constant velocity. A constant motion system is typically more accurate and controllable than a discrete motion system. In an alternative embodiment, the media motion can be achieved by a vacuum platten in a continuous fashion. Advantages of continuous media motion include reduced banding and better dot placement accuracy for better print quality. In an alternative embodiment, a discrete motion media transport mechanism may be used.

In one embodiment, assembly 126 extends at least a pagewidth in length (e.g., 8.5 inches, 11 inches or A4 width) and ejects fluid droplets onto the media 130 as the media 130 is moved relative to the substantially stationary assembly 126. In one embodiment, fluid is supplied to assembly 126 from fluid supply 122. In an alternative embodiment, assembly 126 includes one or more internal fluid supplies. In one form of the invention, multiple assemblies 126 are combined to form a larger and/or faster assembly.

At least one input/output port 134, and a plurality of electronic chips 136A–136B for performing various processing and control functions described herein, are mounted on PCA 138. Cable 132 is coupled to input/output port 134 and, in one form of the invention, is configured to be coupled to a host computer (not shown). Although for simplicity of illustration, a single input/output port 134 and cable 132 are shown in FIG. 1, it will be understood by a person of ordinary skill in the art that device 100 may incorporate a number of different types of conventional input/output ports, including a telephone port, Centronics port, smart media memory devices, solid state storage systems, infrared and/or other wireless ports, as well as other communication protocols commonly available in the industry.

In one form of the invention, an optical path 110 is formed from the light source 106 through mirrors 112, 114, and 118, to the assembly 126. Deflection mirrors 114 and 118 are installed to bend the light path for the purpose of reducing the size of the device 100. Mirrors 114 and 118 can be dispensed with if such reduction in size is not desired.

Figure 2:
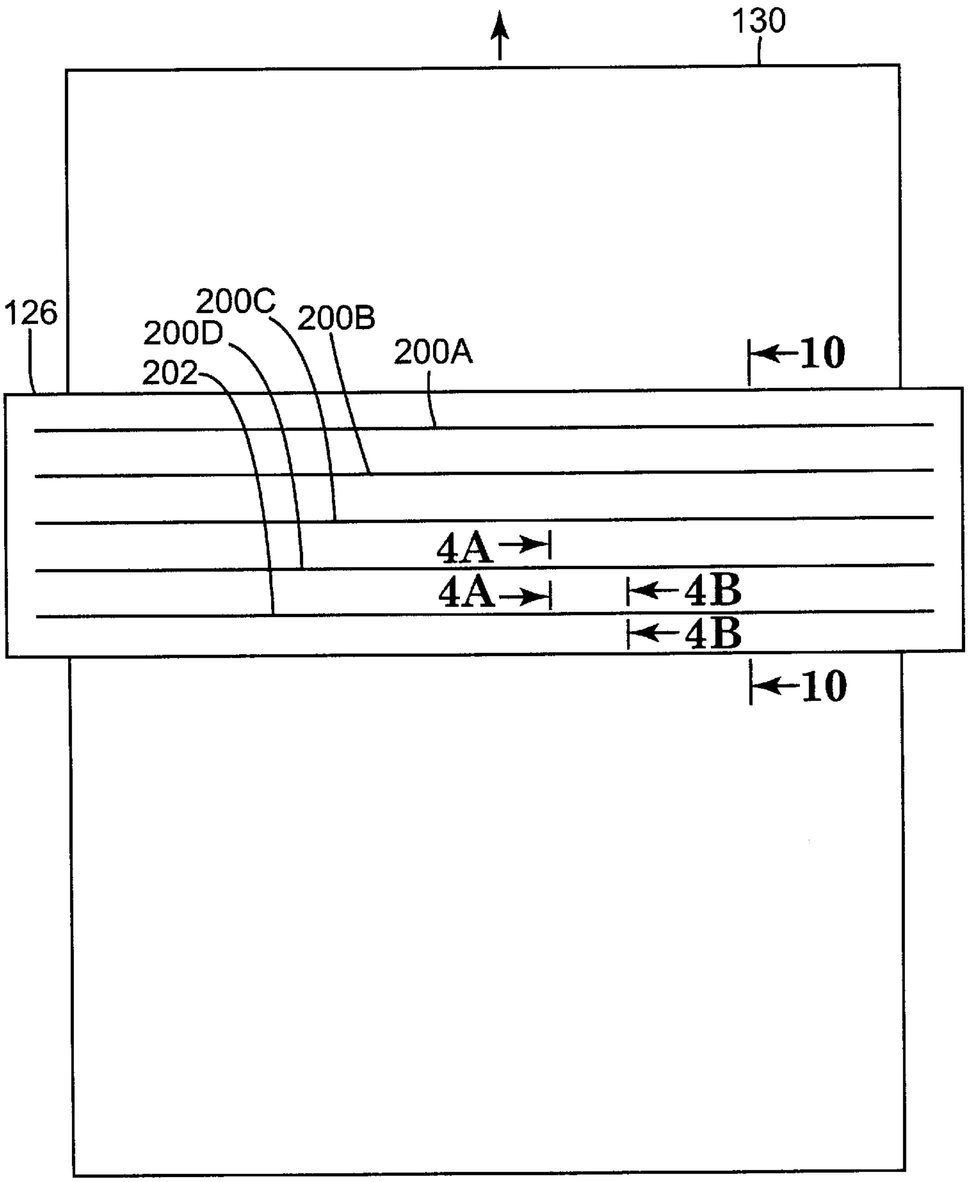
FIG. 2 is a plan view illustrating one embodiment of a fluid ejection and scanning assembly, such as a PWA printhead and scanning assembly, according to one embodiment of the present invention.

FIG. 2 is a plan view illustrating an embodiment of assembly 126. Assembly 126 is shown positioned over media 130, with the direction of media motion indicated by an arrow above media 130. In one embodiment, assembly 126 includes four fluid ejection arrays such as print arrays, represented by lines 200A–200D in FIG. 2, and collectively referred to as fluid ejection arrays 200, as well as one scan array 202. In one embodiment, fluid ejection array 200A is a black print array for ejecting dots of black colored ink, fluid ejection array 200B is a magenta print array for ejecting dots of magenta colored ink, fluid ejection array 200C is a yellow print array for ejecting dots of yellow colored ink, and fluid ejection array 200D is a cyan print array for ejecting dots of cyan colored ink.

Scan array 202 is configured to capture image data for generating a digital image of media. For black and white printing rather than color printing, a single fluid ejection array 200 is desired. The order of the colors may change depending on ink types and other writing system factors.

Figure 3A:
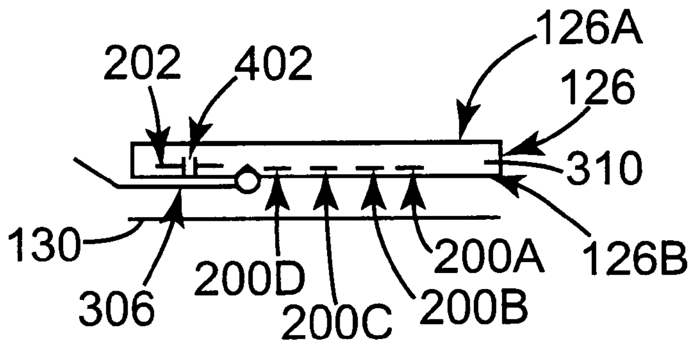
FIG. 3A is a simplified end or side view of a fluid ejection and scanning assembly, such as a PWA printhead and scanning assembly, according to one embodiment of the present invention.

FIG. 3A is a simplified end or side view of assembly 126 according to one embodiment of the present invention. Fluid ejection arrays 200 and scan array 202 are formed on substrate 310. In one embodiment, a clear window 402 is formed in scan array 202. Assembly 126 includes opposing surfaces 126A and 126B.

In a print mode according to one form of the invention, media 130 is transported adjacent to surface 126B of assembly 126, and fluid is ejected from arrays 200 at surface 126B onto media 130. In one form of the invention, assembly 126 includes protective cover 306, which aids in preventing scan array 202 from being contaminated by stray droplets of fluid ejected by fluid ejection arrays 200.

In a scan mode according to one embodiment, media 130 is transported adjacent to surface 126B of assembly 126 to allow the sensing of the printed image by scan array 202. In one embodiment, protective cover 306 is removable, and is removed for image scanning. In one embodiment, the inside of the cover 306 includes a white calibration surface for pixel-to-pixel calibration of the scanner.

Figure 3B:
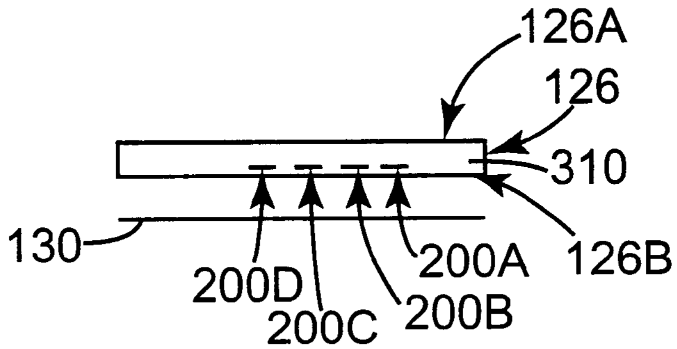
FIG. 3B is a simplified end or side view of a fluid ejection assembly, such as a PWA printhead assembly, according to one embodiment of the present invention.

FIG. 3B is a simplified end or side view of assembly 126 according to one embodiment of the present invention. FIG. 3B is similar to FIG. 3A, wherein like reference numerals designate like symbols, except FIG. 3B does not include the scanning assembly or scan array 202.

Fluid ejection arrays 200 are formed on substrate 310. Assembly 126 includes opposing surfaces 126A and 126B. In a print mode according to one form of the invention, media 130 is transported adjacent to surface 126B of assembly 126, and fluid is ejected from arrays 200 at surface 126B onto media 130.

Figure 4A:
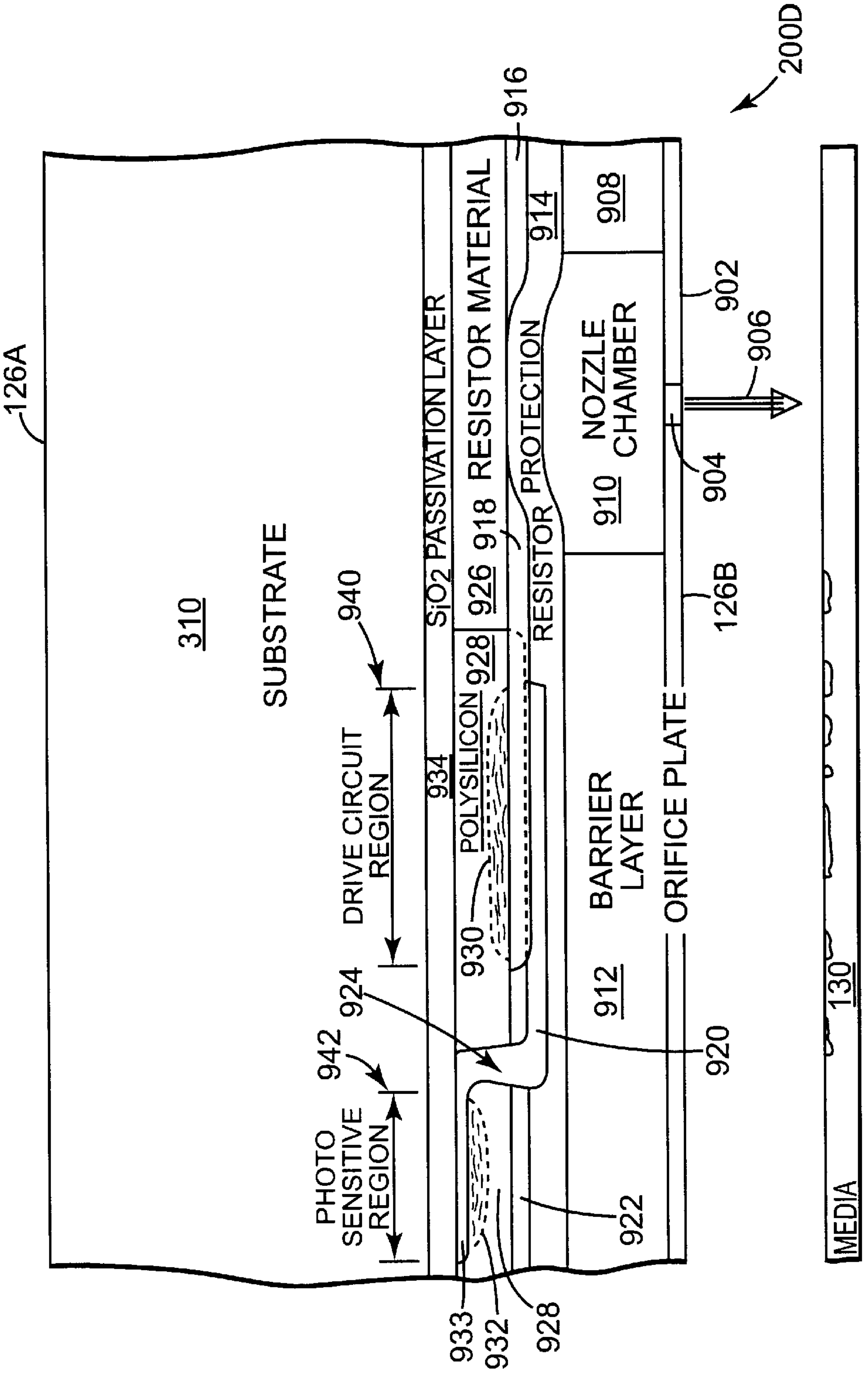
FIG. 4A is a cross-sectional view from the perspective of section lines 4A—4A in FIG. 2, illustrating major components of a portion of a fluid ejection array according to one embodiment of the present invention.

FIG. 4A is a cross-sectional view from the perspective of section lines 4A—4A in FIG. 2 illustrating major components of a portion of fluid ejection array 200D according to one embodiment of the present invention. In one embodiment, fluid ejection arrays 200A–200C are constructed in substantially the same manner as illustrated, and described herein, for fluid ejection array 200D. In one form of the invention, fluid ejection array 200D includes orifice plate 902, fluid channel 908, nozzle chamber 910, barrier layer 912, resistor protection layer 914, resistor electrodes 916 and 918, electrode 920, gate oxide layer 922, via 924, resistor material 926, polysilicon layer 928, doped wells 930 and 932, photosensor electrodes 933, $SiO_2$ passivation layer 934, and substrate 310.

In one embodiment, substrate 310 is a transparent glass substrate, and arrays 200 and 202 are fabricated using thin film technology (TFT) and amorphous silicon, as described in further detail below. In an alternative embodiment, substrate 310 is a substantially transparent polymer, or other substantially transparent material.

$SiO_2$ passivation layer 934 is formed on substrate 310 to prevent impurities from substrate 310 from reaching polysilicon layer 928. Resistor material 926 is formed on $SiO_2$ passivation layer 934. Resistor electrodes 916 and 918 are formed on each end of resistor material 926.

Polysilicon layer 928 is formed by first depositing a thin film layer of amorphous silicon on $SiO_2$ passivation layer 934. The amorphous silicon is then recrystallized by a laser. The temperature of the deposited silicon is locally raised and allowed to cool slowly, thereby recrystallizing the silicon. This process will minimize the grain boundaries, and enhance the electron mobility characteristics of the amorphous silicon.

In an alternative embodiment of the present invention, quartz glass is used for substrate 310, which has a substantially higher glass transition temperature, and allows oven recrystallization of the silicon 928. Subsequent to the recrystallization, a gate oxide layer 922 is deposited on top of the polysilicon layer 928, and is then etched to provide pathways for diffusion of dopants. The dopants are diffused into polysilicon layer 928 and form doped wells 930 and 932. In one embodiment, field effect transistors 802 and 806 (shown in FIG. 5) are positioned in drive circuit region 940, and are formed from doped well 930 and the surrounding polysilicon 928. In one embodiment, photosensor 710 (shown in FIG. 5) is positioned in photosensitive region 942, and is formed from doped well 932 and the surrounding polysilicon 928. An aluminum metal layer is deposited on gate oxide layer 922 and is then etched to form electrode 920.

In one embodiment, polysilicon layer 928 is a P-type semiconductor material, and doped wells 930 and 932 are formed by diffusing N-type dopants in polysilicon layer 928. In an alternative embodiment, polysilicon layer 928 is an N-type semiconductor material, and doped wells 930 and 932 are formed by diffusing P-type dopants in polysilicon layer 928.

Resistor protection layer 914 is formed over resistor contacts 916 and 918, resistor material 926, electrode 920, and gate oxide layer 922. Barrier layer 912 is formed on resistor protection layer 914, and defines a nozzle chamber 910. Orifice plate 902 is formed on barrier layer 912 and over nozzle chamber 910 and fluid channel 908. In one embodiment, orifice plate 902 and barrier layer 912 are integral. Orifice 904 provides an exit path for fluid in nozzle chamber 910, as indicted by arrow 906.

Media 130 is fed adjacent to surface 126B of the assembly 126 during fluid ejection (or scanning). In one embodiment, as media 130 moves relative to assembly 126, fluid droplets are ejected from nozzles or orifices 904 to form markings representing characters or images. In one embodiment, assembly 126 includes thousands of nozzles 904 across its length, but only select ejection elements (e.g., resistor material 926) are activated at a given time to eject fluid droplets to achieve the desired markings.

Figure 4B:
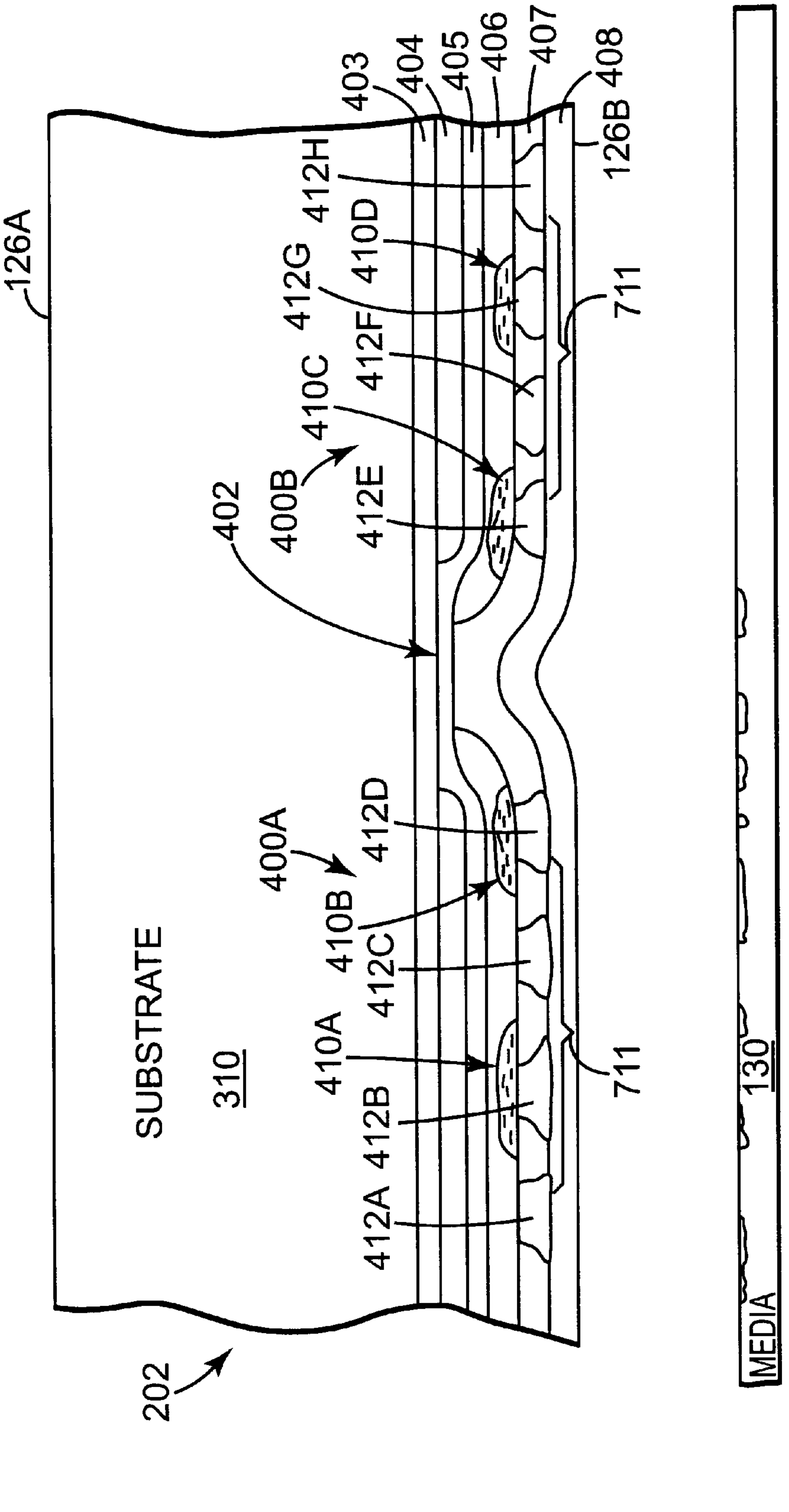
FIG. 4B is a cross-sectional view from the perspective of section lines 4B—4B in FIG. 2, as well as in FIG. 8, illustrating major components of a portion of a scan array according to one embodiment of the present invention.

FIG. 4B is a cross-sectional view from the perspective of section lines 4B—4B in FIG. 2 illustrating major components of a portion of scan array 202 according to one embodiment of the present invention. In one embodiment, scan array 202 includes a plurality of thin film layers 403–408 formed on substrate 310, doped wells 410A–410D, and electrodes 412A–412H. In one form of the invention, layer 403 is a transparent $SiO_2$ layer, layer 404 is metal, layer 405 is a transparent $SiO_2$ isolation layer, layer 406 is polysilicon, layer 407 is a transparent gate oxide, and layer 408 is a transparent protective $SiO_2$ layer.

In one form of the invention, layers 403, 404, 406, and 407, of scan array 202 are formed from the same material and correspond to layers 934, 933, 928, and 922 (shown in FIG. 4A), respectively, in fluid ejection arrays 200. In one embodiment, the corresponding layers in scan array 202 and fluid ejection arrays 200 are deposited at the same time, and appropriate mask and etching steps are performed to form the various features of arrays 200 and 202 illustrated in the Figures and described herein.

In one form of the invention, $SiO_2$ layer 403 is formed on substrate 310. Metal layer 404 is formed on $SiO_2$ layer 403, and is etched to form clear window 402 as described in more detail below. In this embodiment, $SiO_2$ isolation layer 405 is formed over metal layer 404 and layer 403. Polysilicon layer 406 is formed on isolation layer 405. Doped wells 410A–410D are formed in polysilicon layer 406 by diffusing dopants into polysilicon layer 406. Electrodes 412A–412H are formed on polysilicon layer 406, and are surrounded by gate oxide layer 407. Protective $SiO_2$ layer 408 is formed on gate oxide layer 407.

In one embodiment, polysilicon layer 406 and doped wells 410A–410D are formed in the same manner as described above for polysilicon layer 928 and doped wells 930 and 932. In one embodiment, polysilicon layer 406 is a P-type semiconductor material, and doped wells 410A–410D are formed by diffusing N-type dopants in polysilicon layer 406. In an alternative embodiment, polysilicon layer 406 is an N-type semiconductor material, and doped wells 410A–410D are formed by diffusing P-type dopants in polysilicon layer 406.

In this embodiment, the clear window 402 is formed through substantially transparent layers 310, 403, 405, 407, and 408. In one embodiment, the width of window 402 is about 0.01 inches for 100 Dots Per Inch (DPI), 0.0033 inches for 300 DPI, 0.00166 inches for 600 DPI, and 0.000833 inches for 1200 DPI. In one embodiment, the separation between media 130 and surface 126B of assembly 126 is about 0.1 millimeters or less.

Two photosensors 711 are formed from doped wells 410A–410D and the surrounding polysilicon 406. Although two photosensors 711 are shown in FIG. 4B to simplify the illustration, in one embodiment, the same basic photosensor configuration is replicated many more times (into the paper) to form a scan array 202 that extends an entire page width. Additionally, although one photosensitive region 942 (wherein a photosensor 710 is formed) is shown in FIG. 4A, in one embodiment, there are three more photosensors 710 adjacent to the illustrated photosensor 710, and many more photosensors 710 into the paper. In one form of the invention, the active portion of each of the photosensors 710 and 711 is approximately thirty-nine microns wide (for 600 DPI).

In one form of the invention, the photosensors 711 in scan array 202 are organized into two groups 400A and 400B, with each group having a different spatial frequency. The signals from both groups 400A and 400B are then deconvolved to provide enhanced resolution. In one embodiment, the spatial frequency of group 400B is ninety-five percent of the spatial frequency of group 400A.

In one form of the invention, photosensors 711 for scan array 202 are similar in architecture and formed in the same fabrication steps as the photosensors 710 for fluid ejection arrays 200.

Figure 5:
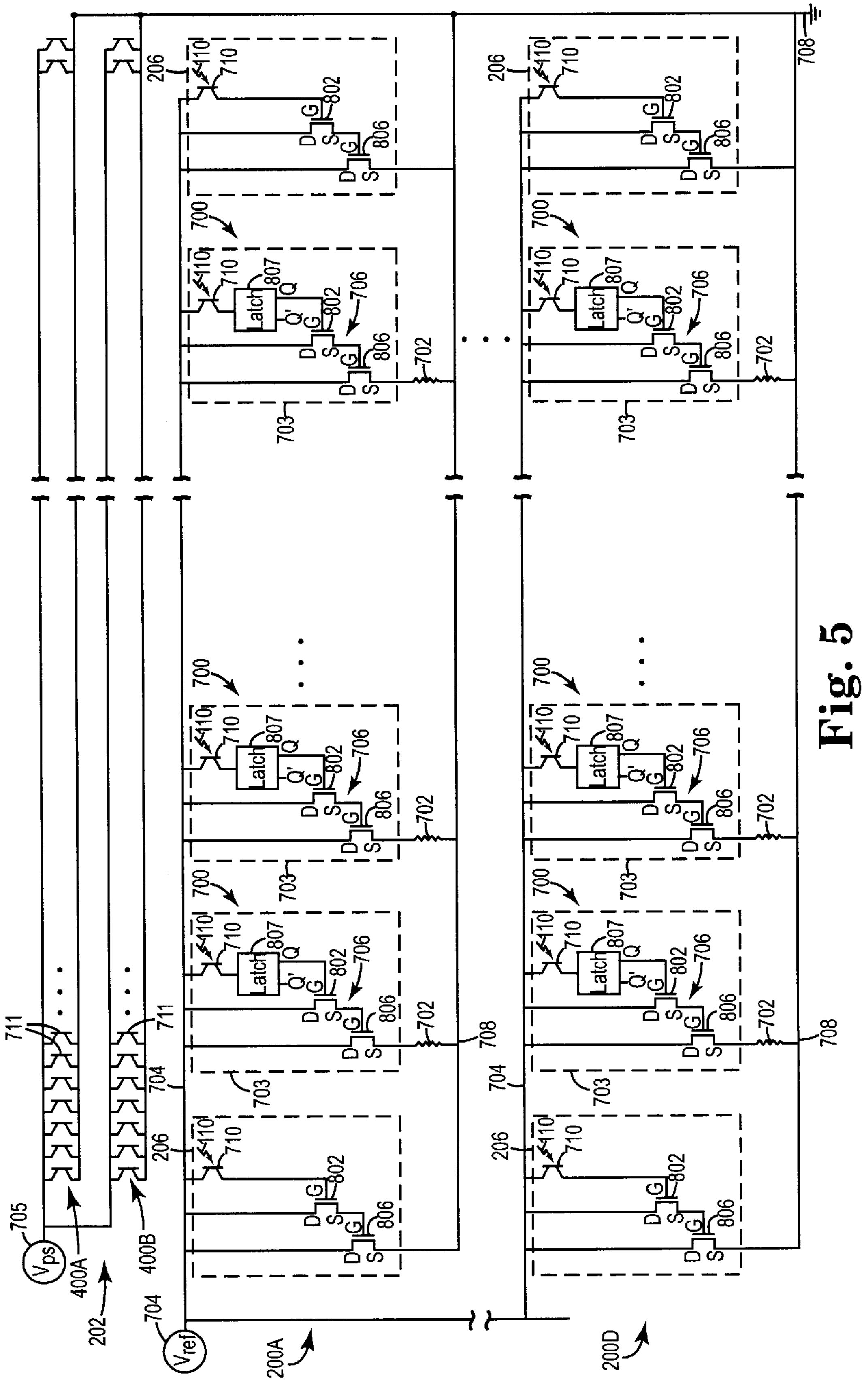
FIG. 5 is an electrical schematic diagram illustrating major components of a scan array and a plurality of fluid ejection arrays according to one embodiment of the present invention.

FIG. 5 is an electrical schematic diagram illustrating major components of the fluid ejection arrays 200 and scan array 202 according to one embodiment of the present invention. Scan array 202 includes a plurality of photosensors 711 organized into groups 400A and 400B. In the illustrated embodiment of FIG. 5, photosensors 711 are photodiodes. Each photosensor 711 is coupled between voltage supply (Vps) 705 and ground bus line 708. Illuminated photosensors 711 output a signal that varies in magnitude based on the intensity of light incident on the photosensor 711.

Each array 200 includes a plurality of light-sensitive activation elements 700. Each activation element 700 includes an ejection element 702, such as a thermal inkjet (TIJ) element or a piezoelectric inkjet (PIJ) element, and an optical triggering circuit 703. In the embodiment shown, ejection elements 702 are thermal inkjet resistors. Each optical triggering circuit 703 includes an amplifier 706, a latch 807, and a photosensor 710. In one embodiment, latch 807 is a T-type flip-flop.

Photosensors 710 convert an input light beam 110 into an electrical signal. As described below, the electrical signals generated by the photosensors 710 in the fluid ejection arrays 200 are used to trigger ejection elements 702 coupled to the photosensors 710.

Amplifier 706 includes transistors 802 and 806. In one embodiment, transistors 802 and 806 are field effect transistors (FETs). Because of the lower electron mobility of amorphous silicon compared with that of crystalline silicon, in this embodiment, transistors 802 and 806 are made wider for glass substrate 310 than they might be for a silicon substrate. In one embodiment, transistor 802 has a length of about 2 to 3 micrometers, and a width of about 100 to 500 micrometers; transistor 806 has a length of about 1 to 2 micrometers, and a width of about 200 to 1000 micrometers; and resistor 702 has a resistance with a range of about 30 to 1500 ohms. In alternative embodiments, other configurations and component dimensions may be used for optical triggering circuit 703.

Each photosensor 710 is coupled to voltage supply (Vref) 704. The output stage of each photosensor 710 is coupled to an input of the corresponding latch 807. An output (Q) of each latch 807 is coupled to the gate of the corresponding transistor 802. The drain of each transistor 802 is coupled to the voltage supply 704, and the source of each transistor 802 is coupled to the gate of the corresponding transistor 806. The drain of each transistor 806 is coupled to the voltage supply 704, and the source of each transistor 806 is coupled to the corresponding resistor or ejection element 702. Each resistor 702 is coupled between the source of the corresponding transistor 806 and the ground bus line 708.

When the activation element 700 is activated by light from light source 106, photosensor 710 becomes conductive. When photosensor 710 is illuminated and becomes conductive and sets latch 807 to turn on transistor 802, transistor 802 causes transistor 806 to also turn on. In this embodiment, transistor 802 acts as a voltage controlled turn-on FET, and transistor 806 acts as a current-controlled drive FET. Transistor 806 then provides a drive current to excite resistor 702, which in turn heats up and ejects fluid from within a corresponding nozzle chamber. In one embodiment, at least some of the fluid is displaced so as to be ejected as a droplet. In one embodiment, latch 807 is subsequently reset by a second pulse of light striking photosensor 710, which causes the circuit to be turned off.

In one embodiment, each array 200 includes at least one dummy pixel 206 at the beginning and the end of the array 200. The dummy pixels 206 of FIG. 5 are configured substantially the same as the activation elements 700, but do not include an ejection element 702 or a latch 807. These dummy pixels 206 provide the control circuitry with a time and position synchronization signal.

In the embodiment illustrated in FIG. 5, photosensors 710 are photodiodes. In an alternative embodiment of the present invention, photosensor 710 is implemented as a phototransistor, and transistor 802 is thereby replaced. In another alternative embodiment with photosensor 710 implemented as a phototransistor, a special aspect ratio field effect transistor is used as the inkjet heating resistor element 702, and a separate TIJ resistor is not used.

Figure 6A:
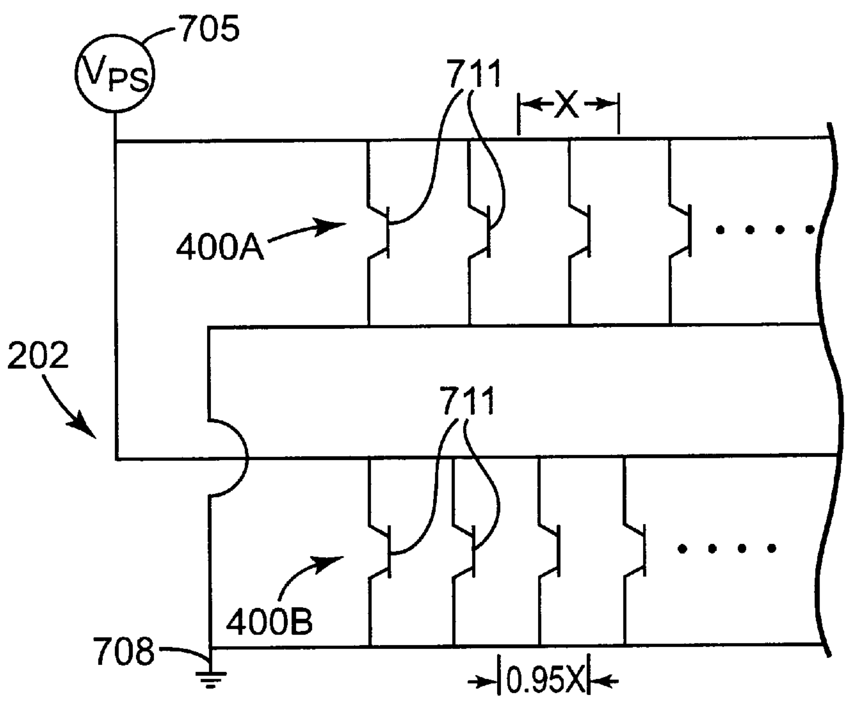
FIG. 6A is an electrical schematic diagram of a portion of the scan array shown in FIG. 5, illustrating the spacing between photosensors in greater detail according to one embodiment of the present invention.

FIG. 6A is an electrical schematic diagram of a portion of scan array 202 shown in FIG. 5, illustrating the spacing between photosensors 711 in greater detail according to one embodiment of the present invention. Photosensors 711 in group 400A are spaced apart by a distance X in the illustrated embodiment, and photosensors 711 in group 400B are spaced apart by a distance 0.95×. For example, if the photosensors 711 in group 400A were spaced at a 300 DPI pitch, the photosensors 711 in group 400B would be spaced at a 0.95 times 300 DPI pitch, or a 314 DPI pitch. In one embodiment, two adjacent photosensors 711 (i.e., one photosensor 711 from group 400A and an adjacent photosensor 711 from group 400B) are referred to herein as a scan array element 712 (shown in FIG. 7).

Figure 6B:
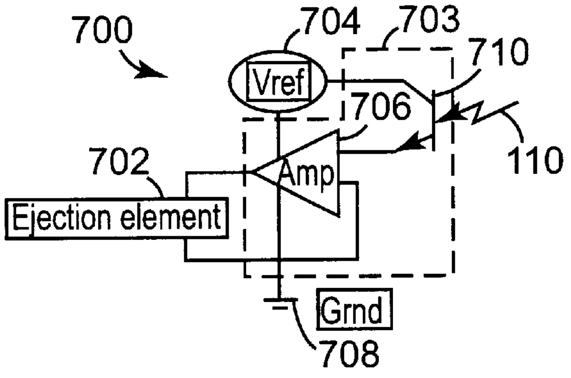
FIG. 6B is an electrical schematic/block diagram illustrating major components of an activation element for a fluid ejection array according to one embodiment of the present invention.

FIG. 6B is an electrical schematic/block diagram illustrating major components of one of the activation elements 700 shown in FIG. 5 according to one embodiment of the present invention. As shown in FIG. 5, the single activation element 700 shown in FIG. 6B is replicated many times to form the fluid ejection arrays 200. The degree of replication depends on the desired resolution, jet redundancy and the width of the device 100. Table I below indicates the number of activation elements 700 and scan array elements 712 (shown in FIG. 7) in assembly 126 for various resolutions according to one embodiment of the present invention:

TABLE I

| Resolution | (Black & White) No. of activation elements | (Color) No. of activation elements | No. of scan array elements | Total no. of elements |
|---|---|---|---|---|
| 100 DPI | 875 | 3500 | 875 | 4375 |
| 300 DPI | 2625 | 10500 | 2625 | 13125 |
| 600 DPI | 5250 | 21000 | 5250 | 26250 |
| 1200 DPI | 10500 | 42000 | 10500 | 52500 |

Each activation element 700 includes the ejection element 702 connected in series with the optical triggering circuit 703. The optical triggering circuit 703 of activation element 700 includes photosensor 710 and amplifier 706. Photosensor 710 is coupled to amplifier 706 and to voltage supply 704. In one embodiment, voltage supply 704 is a twelve volt supply. Amplifier 706 is coupled to voltage supply 704, ejection element 702, and to ground bus line 708.

Optical triggering circuit 703 acts as a photo switch that turns on the ejection element 702 when light from light source 106 is directed onto photosensor 710. Photosensor 710 becomes conductive upon impact by a stream of photons, and outputs a relatively low voltage output signal to amplifier 706. Amplifier 706 amplifies the received signal and delivers a corresponding pulse to ejection element 702 to fire the element 702. Amplifier 706 delivers the necessary turn-on-energy (TOE) to the ejection element 702.

Figure 7:
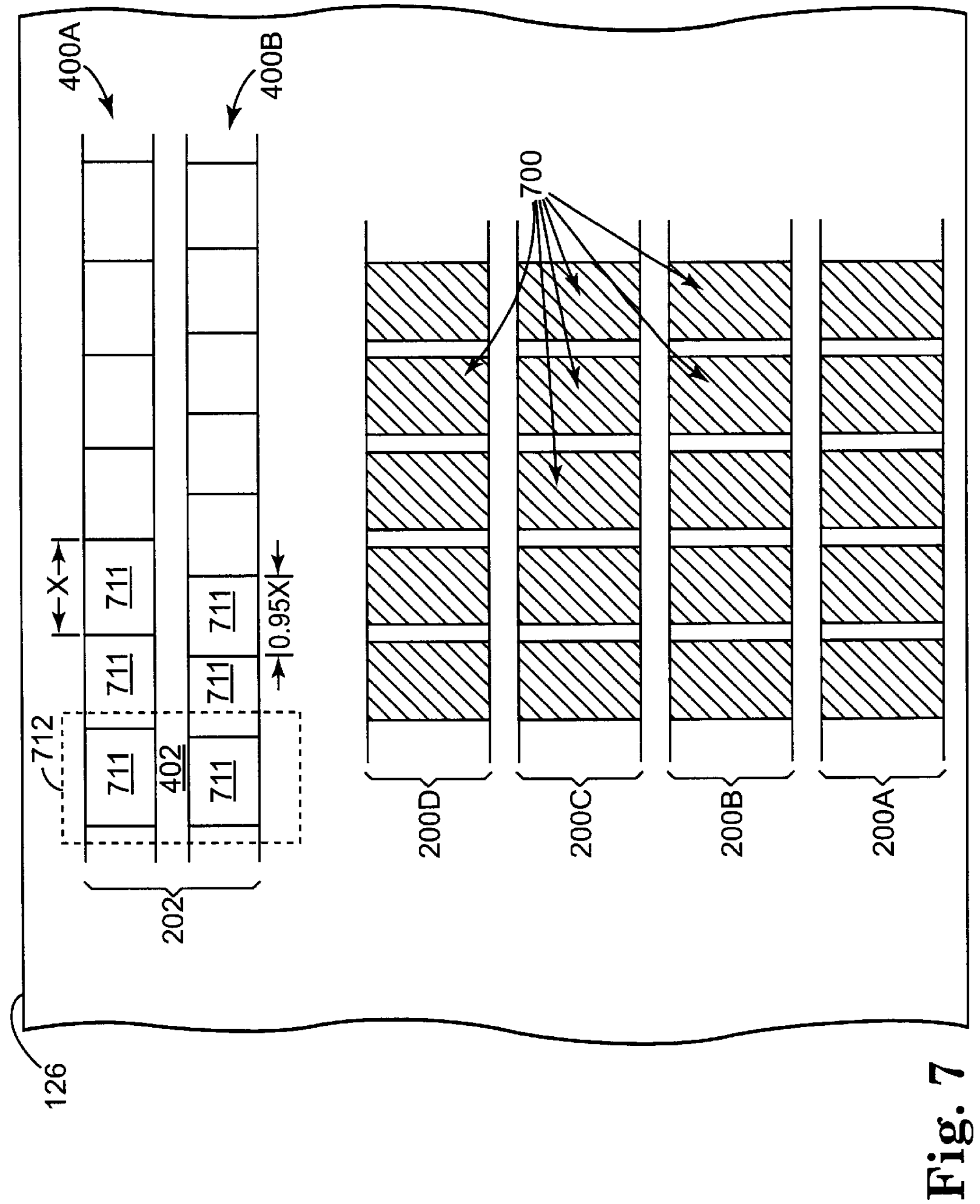
FIG. 7 is a diagram of a fluid ejection and scanning assembly illustrating a scan array and fluid ejection arrays in block form according to one embodiment of the present invention.

FIG. 7 is a diagram of assembly 126 illustrating scan array 202 and fluid ejection arrays 200 in block form according to one embodiment of the present invention. Group 400A of photosensors 711 is separated from group 400B of photosensors 711 by substantially clear window 402. In one embodiment, activation elements 700 in fluid ejection arrays 200 are arranged in a plurality of rows and a plurality of columns as illustrated in FIG. 7.

Figure 8A:
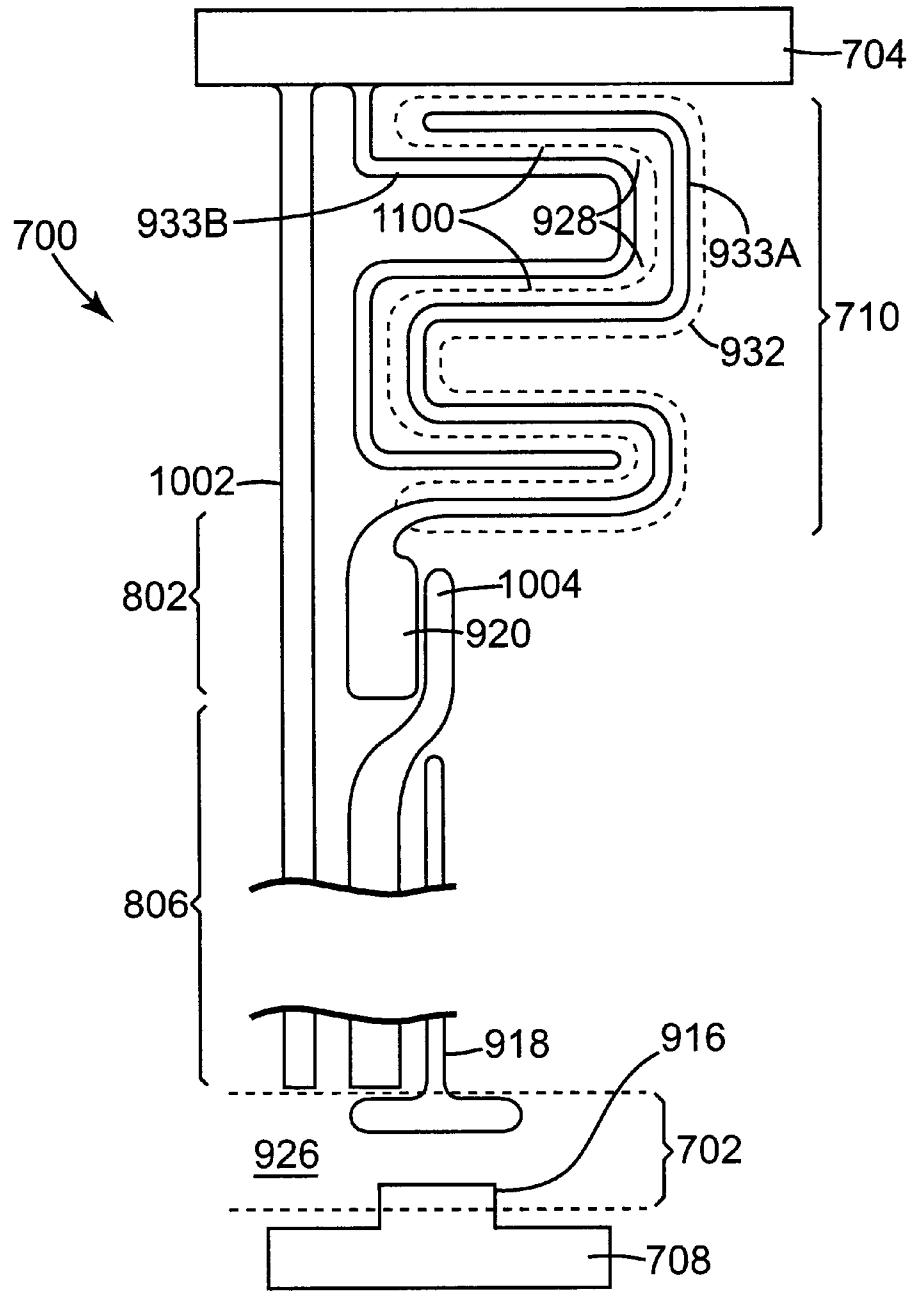
FIG. 8A is a diagram illustrating the layout of electrodes for an activation element according to one embodiment of the present invention.

FIG. 8A is a diagram illustrating the layout of the components of a single activation element 700 (shown in block form in FIG. 7) according to one embodiment of the present invention. It will be understood by a person of ordinary skill in the art that the layout shown in FIG. 8A will be replicated many times over to form a fluid ejection array 200. FIG. 8A is a view of the electrodes from the perspective of resistor protection layer 914 (shown in FIG. 4A) looking towards glass substrate 310.

As shown in FIG. 8A, the electrodes for photosensor 710 consist of two serpentine-shaped electrodes 933A and 933B (collectively referred to as electrodes 933). Electrode 933B is coupled to voltage supply line 704. Electrode 933A is coupled to electrode 920. Electrode 920 is coupled to the gate of transistor 802, which is formed from doped well 930 and surrounding polysilicon 928. In one embodiment, electrode 920 couples the gate of field effect transistor 802 to photosensor electrode 933A by way of via 924 (shown in FIG. 4A).

Doped well 932 is electrically connected to electrode 933A, and has substantially the same serpentine shape as electrode 933A. Polysilicon 928 surrounds doped well 932. A serpentine-shaped N-P junction 1100 is formed at the interface between the polysilicon 928 and the serpentine-shaped doped well 932. The serpentine-shaped N-P junction 1100 is positioned between the serpentine-shaped electrodes 933A and 933B. The serpentine-shaped N-P junction 1100 and the serpentine-shaped electrodes 933A and 933B essentially form a solid-state photodiode, which is referred to as photosite or photosensor 710.

The electrodes for field effect transistor 802 consist of electrodes 1002, 920, and 1004. Electrode 1002 is coupled to the drain, electrode 920 is coupled to the gate, and electrode 1004 is coupled to the source, of field effect transistor 802. The electrodes for field effect transistor 806 consist of electrodes 1002, 1004, and 918. Electrode 1002 is coupled to the drain, electrode 1004 is coupled to the gate, and electrode 918 is coupled to the source, of field effect transistor 806.

The electrodes for resistor 702 (formed from resistor material 926) consist of electrodes 916 and 918. Electrode 918 couples resistor 702 to the source of transistor 806, and electrode 916 couples resistor 702 to ground line 708.

Figure 8B:
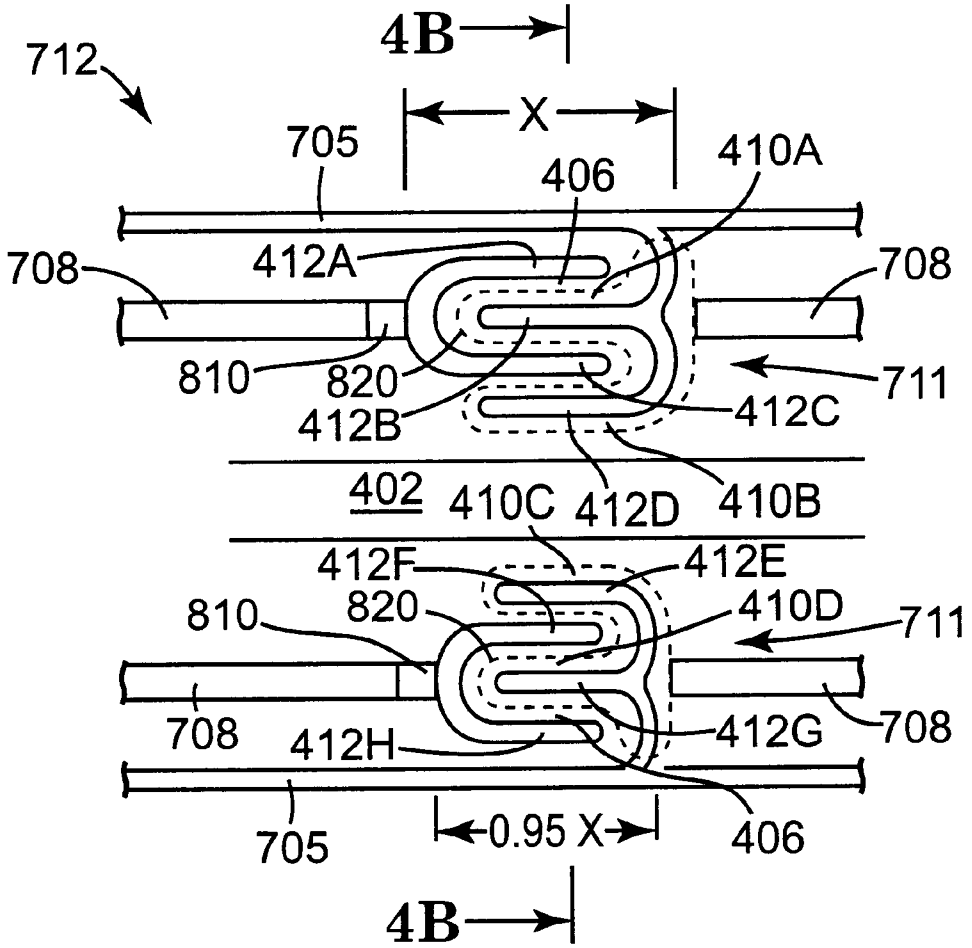
FIG. 8B is a diagram illustrating the layout of electrodes for a scan array element according to one embodiment of the present invention.

FIG. 8B is a diagram illustrating the layout of electrodes for a single scan array element 712 (shown in block form in FIG. 7) according to one embodiment of the present invention. It will be understood by a person of ordinary skill in the art that the layout shown in FIG. 8B will be replicated many times over to form scan array 202. FIG. 8B is a view of the electrodes from the perspective of $SiO_2$ layer 408 (shown in FIG. 4B) looking towards substrate 310. The view of FIG. 4B is illustrated by section lines 4B—4B in FIG. 8B, as well as in FIG. 2.

Electrodes 412A and 412C, which appear to be two separate electrodes when illustrated in cross-section as shown in FIG. 4B, are actually a single, C-shaped electrode 412A/412C, which is in electrical contact with polysilicon layer 406. Similarly, electrodes 412B and 412D are a single, W-shaped electrode 412B/412D, and doped wells 410A and 410B are a single doped well 410A/410B that has substantially the same shape as electrode 412B/412D. Electrode 412B/412D is in electrical contact with doped well 410A/410B. Electrode 412A/412C is connected to ground bus line 708 by via 810. Electrode 412B/412D is connected to voltage supply line 705.

A serpentine-shaped N-P junction 820 is formed at the interface between polysilicon layer 406 and the doped well 410A/410B. The serpentine-shaped N-P junction 820 is positioned between the electrode 412A/412C and the electrode 412B/412D. The serpentine-shaped N-P junction 820, the electrode 412A/412C, and the electrode 412B/412D, essentially form a solid-state photodiode, which is referred to as photosite or photosensor 711.

As shown in the embodiment of FIG. 8B, electrodes 412E–412H and doped wells 410C and 410D are configured substantially the same as electrodes 412A–412D and doped wells 410A and 410B to form a second photosensor 711. The two photosensors 711 illustrated in FIG. 8B are separated by clear window 402.

Figure 9A:
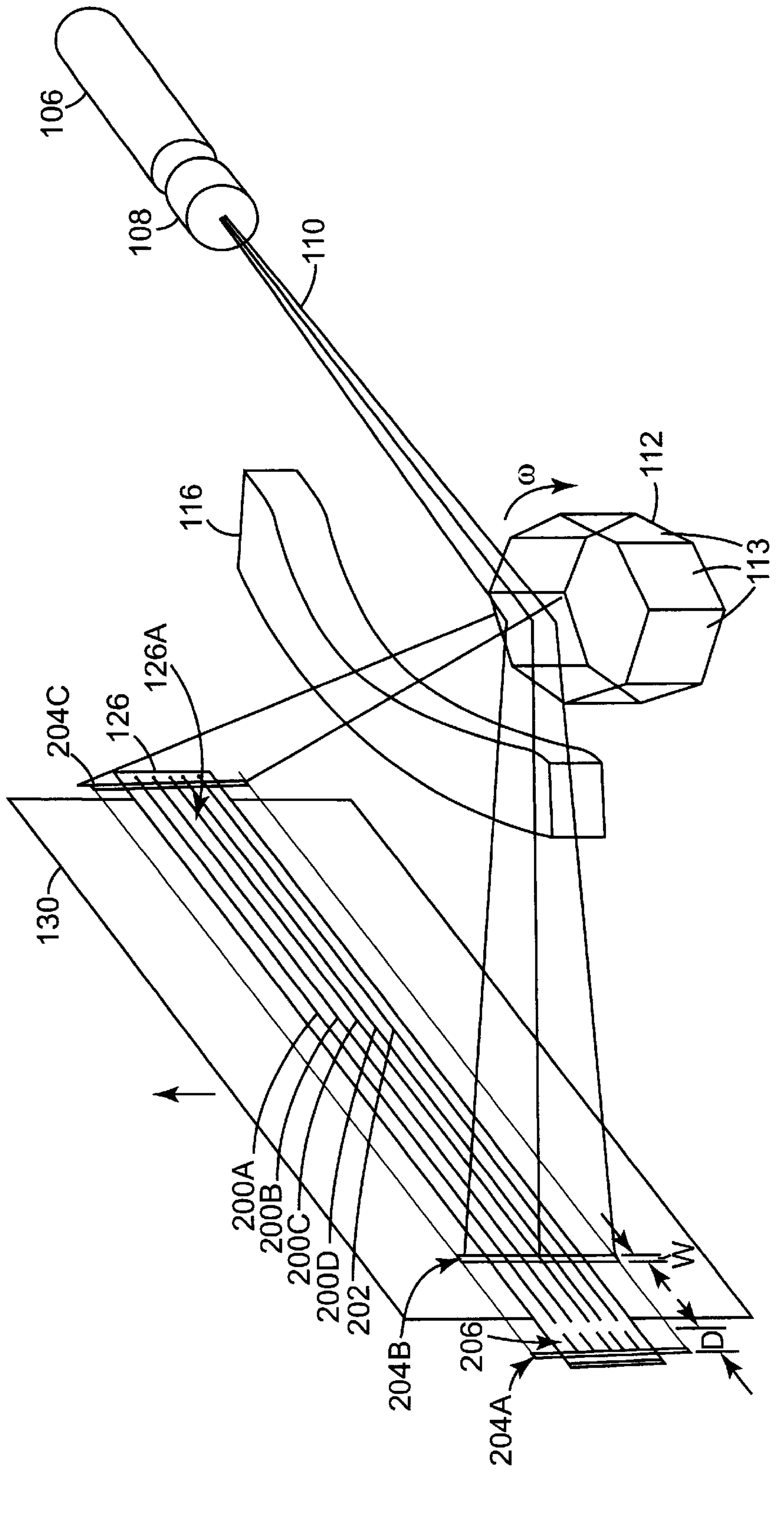
FIG. 9A is a diagram illustrating scanning of a light beam from a light source across a fluid ejection and scanning assembly according to one embodiment of the present invention.

FIG. 9A is a diagram illustrating scanning of a light beam 110 from light source 106 across assembly 126 according to one embodiment of the present invention. To simplify the illustration and explanation of the scanning of light beam 110, deflection mirrors 114 and 118 (shown in FIG. 1) are omitted from FIG. 9A.

In the embodiment shown in FIG. 9A, light source 106 emits a light beam, which is modulated by modulator 108, onto rotating polygonal mirror 112. In one embodiment, source 106 is a laser light source that is pulsed, and the light beam emitted by light source 106 is collimated by a collimator lens (not shown). In one form of the invention, multiple light sources 106 are used to speed up the fluid ejection process. The light beam is modulated by modulator 108 in accordance with dot image data. In one embodiment, polygonal mirror 112 includes six, eight, or more reflective surfaces 113, and is rotated at a constant angular velocity, ω, around its central axis for scanning light beam 110 across surface 126A of assembly 126. Polygonal mirror 112 deflects light beam 110 toward lens 116. Lens 116 directs light beam 110 onto the surface 126A of assembly 126. In one form of the invention, the light beam or the optical path 110 scanned across surface 126A selectively switches the desired ejection elements 702 of the fluid ejection arrays 200, as described in more detail herein.

In one embodiment, lens 116 is a standard "f-θ" optical design and its characteristics are identical to conventional electrophotographic printer optics that convert the scanning at a constant angular velocity into scanning at a constant line speed along the linear scan line, as well as correcting for the variable optical path differences, across assembly 126 as is known to those of ordinary skill in the art. Lens 116 is designed so that a beam incident on the lens at an angle θ with its optical axis is focused on surface 126A away from the lens 116 by the focal distance, f, of the lens 116, at a position fθ away from the optical axis of the lens 116, which is the same function that is performed by optics in conventional electrophotographic systems.

One form of the invention uses techniques similar to those used in the art of electrophotographic laser printers for light beam scanning using a polygonal mirror and an f-θ lens. In one embodiment, the shape of the light beam 110 directed onto surface 126A of assembly 126 is different than the shape of the light beam typically used in electrophotographic laser printers. Electrophotographic laser printers typically use point illumination, whereas one form of the present invention uses line illumination to simultaneously illuminate activation elements 700 in all four fluid ejection arrays 200 and photosensors 711 in scan array 202. Three line-shaped light beam "footprints" 204A–204C are shown in FIG. 9A, which illustrate the movement of the light beam 110 from left to right across surface 126A of assembly 126. In one embodiment, the light beam footprints 204A–204C have a width "W," which is about three microns, and a length that is slightly greater than the height of assembly 126.

By using a scanning light beam 110 having a width (e.g., three microns) that is in one embodiment much narrower than the width of each photosite (e.g., thirty-nine microns), a good deal of flexibility is provided for the timing and pulse-width modulation of the signal from the source 106.

The light source 106 is used for triggering fluid ejection by arrays 200, and, in one form of the invention, the same light source 106 is also used as a scanner light source for digitizing hard-copy images, thereby adding more functionality to device 100, with minimal added cost and space consumption.

Figure 11:
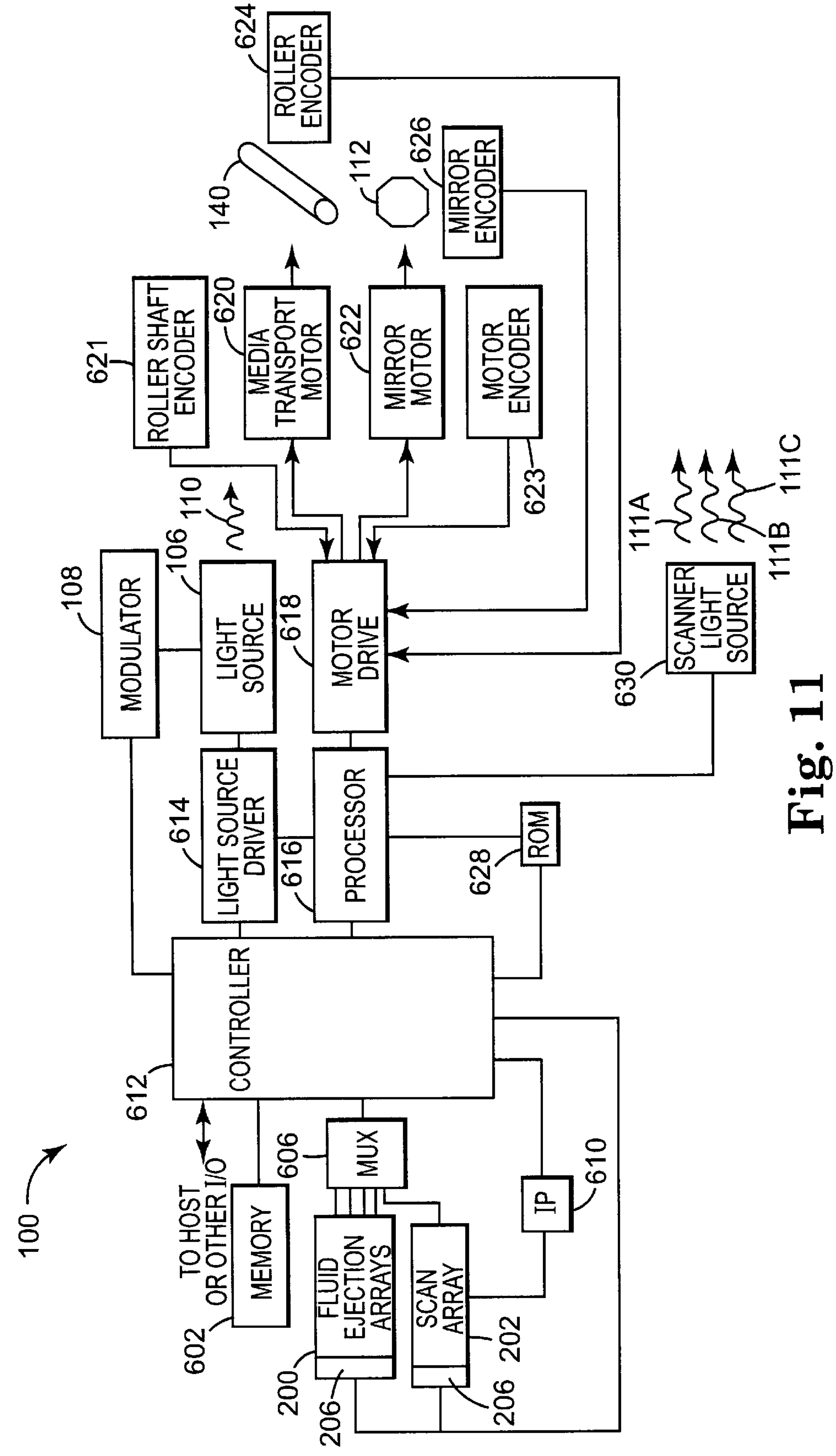
FIG. 11 is an electrical block diagram illustrating major components of a fluid ejection and scanning system according to one embodiment of the present invention.

In one embodiment, the four fluid ejection arrays 200 and scan array 202 are electronically multiplexed (as shown in FIG. 11 and described with reference to FIG. 11), with one of the four fluid ejection arrays 200 or the scan array 202 being enabled at any given time. In one embodiment of a print mode, one raster row of one of the color planes (i.e., black, magenta, yellow, or cyan) is printed during each scan pass of light beam 110. In one embodiment of a scan mode, one line of a medium is scanned during each pass of light beam 110. In one form of the invention, four consecutive scan passes of light beam 110 will print cyan raster row 1, yellow raster row 1+n, magenta raster row 1+2n, and black raster row 1+3n, where "n" designates an integer multiple of the DPI fundamental spacing for synchronous printing of each color plane with respect to the other color planes in the array of nozzles.

In another embodiment, all four fluid ejection arrays 200 are operated simultaneously during a scan pass of light beam 110. In yet another embodiment, device 100 uses point illumination, rather than line illumination, to illuminate a single one of the fluid ejection arrays 200 during a scan pass of light beam 110. In one form of the invention, when point illumination is used, the reflection surfaces 113 of polygonal mirror 112 are positioned at different angles with respect to the central axis of polygonal mirror 112 to illuminate a different one of the fluid ejection arrays 200 during each scan pass of light beam 110. In another alternative embodiment, device 100 uses point illumination with multiple light points to simultaneously illuminate all four fluid ejection arrays 200 during a scan pass of light beam 110. The four light or laser points or light dots are generated by a beam splitter (not shown) positioned in front of light source 106. In another alternative embodiment, the four light or laser points are generated by four different light sources 106.

During scanning of the light beam 110 across surface 126A by the rotation of the polygonal mirror 112, media 130 is moved by rollers 120, 124, 140, and 142, and star-wheel 128, (shown in FIG. 1), or via another media transport system, in the direction shown by the arrow above media 130 in FIG. 9A.

As described in further detail below, the media transport system is synchronized with the angular velocity of rotating polygonal mirror 112, since the angular velocity of mirror 112 determines the appropriate timing for fluid droplet ejection by assembly 126, and the media motion affects the accuracy of dot placement on the media.

In one form of the invention, scanning and printing do not occur simultaneously in device 100, and device 100 is configured to operate with two different angular velocities of polygonal mirror 112—one angular velocity for printing, and a second angular velocity for scanning. In another embodiment, the same angular velocity is used for printing and scanning.

In one form of the invention, each one of the arrays 200 and 202 includes a plurality of elements 206 at the beginning of the array, which are referred to as "dummy pixels" as previously described with respect to FIG. 5. As shown in FIG. 9A, the amount of each array 200 and 202 that is dedicated to dummy pixels 206 is represented by the letter "D," which varies in length depending on the desired number of dummy pixels 206. In another embodiment, each array 200 and 202 includes dummy pixels 206 at the beginning and the end of the array. Dummy pixels 206 are provided to generate a signal to latch the raster line data, which is used in the modulation of the light beam 110. Dummy pixels 206 enable timing corrections to be made to compensate for positional variations within a particular assembly 126, and variations from one assembly 126 to another. In one embodiment, dummy pixels 206 are non-printing elements, and are used for sensing the true position of light beam 110.

Figure 9B:
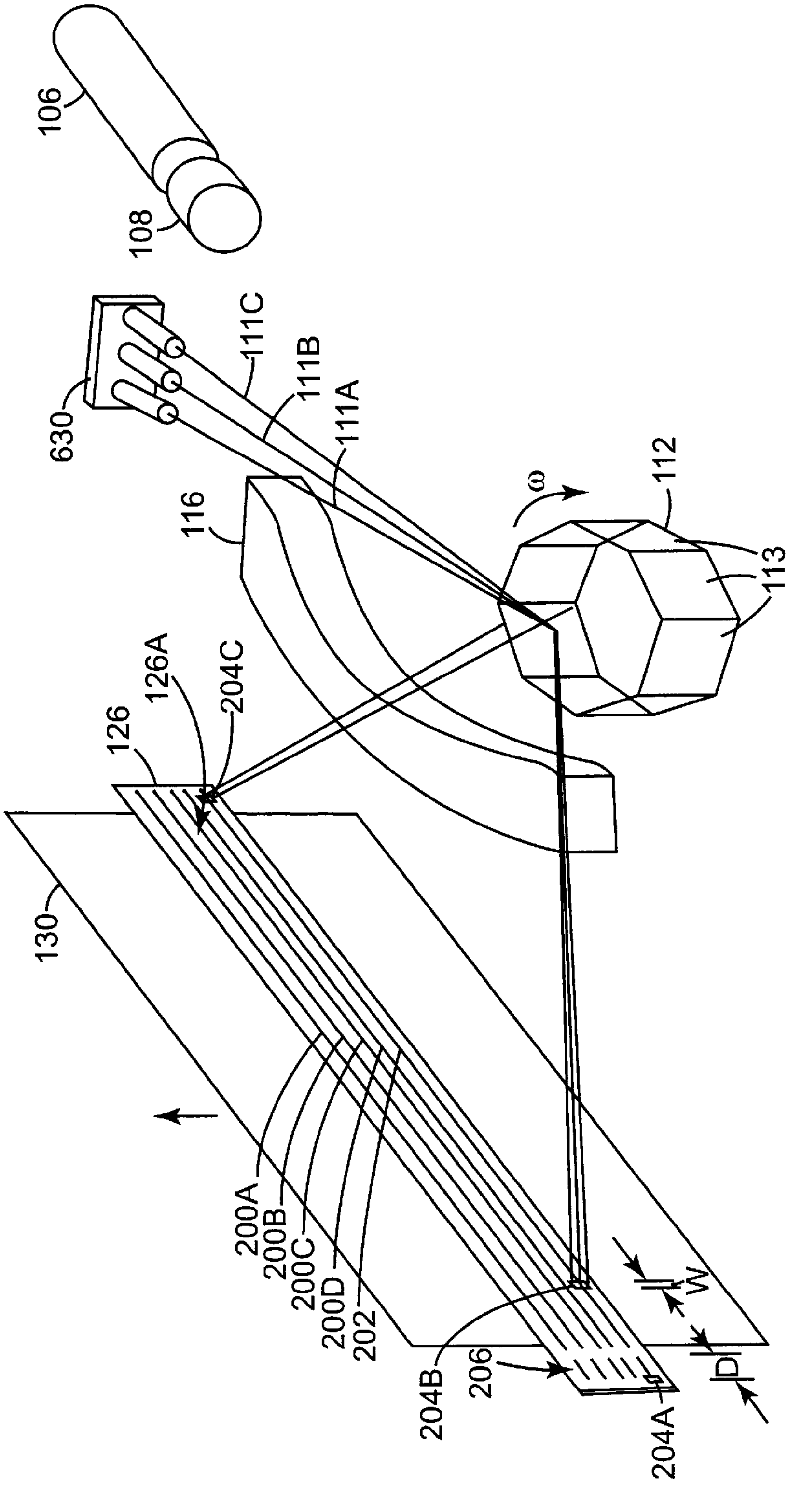
FIG. 9B is a diagram illustrating scanning of light beams from a second light source across a scanning assembly according to one embodiment of the present invention.

FIG. 9B is a diagram illustrating scanning of light beams 111A–111C (collectively referred to as light beams 111) from light source 630 across assembly 126 according to one embodiment of the present invention. FIG. 9B is substantially the same as FIG. 9A, but a second light source 630 has been added to provide illumination for color scanning of a media.

In the illustrated embodiment of FIG. 9B, light source 630 is an RGB (Red-Green-Blue) light source for emitting a red light beam 111A, a green light beam 111B, and a blue light beam 111C. In an alternative embodiment, the second light source 630 is a multi-spectral light emitting diode (LED) bar for emitting red, green, and blue light. In one form of the invention, the light source 630 is pulse width modulated to provide different pulse widths for red, green, and blue. The pulse width modulation is performed based on the particular absorption characteristics of the photosensors 711 to optimize the color balance. In another embodiment, one of light sources 106 or 630 may be used for drying fluid that has been ejected onto a media 130, or an additional light source may be added to device 100 for this purpose.

In one embodiment, light beams 111 are scanned across surface 126A of assembly 126 in substantially the same manner as described above for light beam 110 from light source 106. In the embodiment illustrated in FIG. 9B, the light beam footprints 204A–204C of the light beams 111 from light source 630 are shorter than for the light beam 110 from the light source 106 to illuminate scan array 202, rather than simultaneously illuminating the four fluid ejection arrays 200 and scan array 202, as light beam 110 does in one form of the invention.

Figure 10:
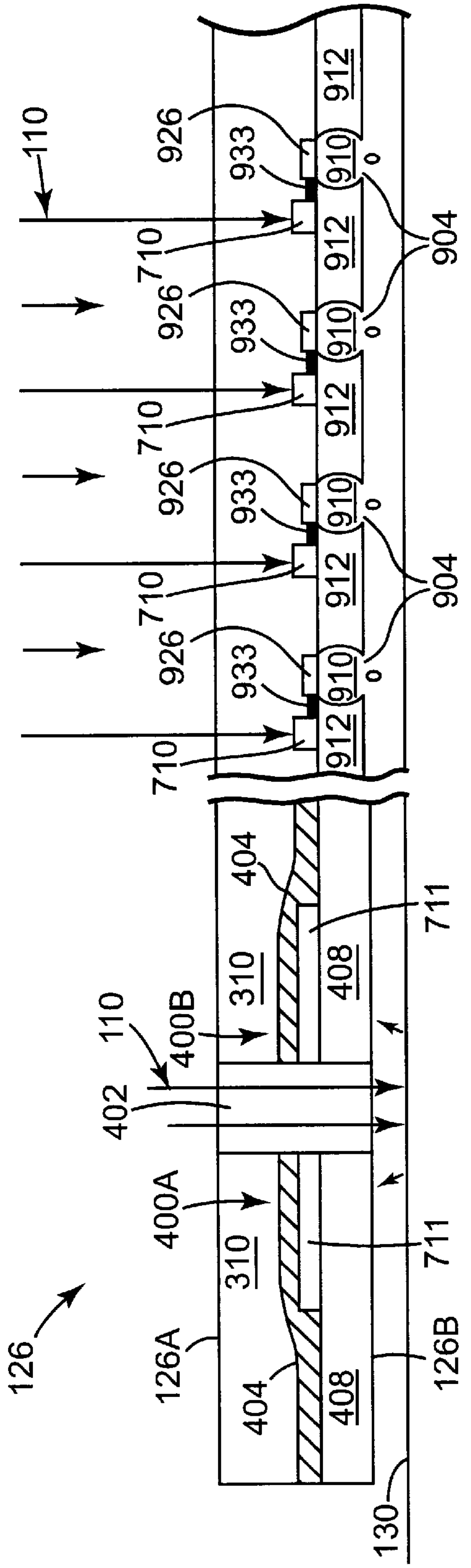
FIG. 10 is a simplified cross-sectional diagram illustrating a fluid ejection and scanning assembly from the perspective of section lines 10—10 in FIG. 2 according to one embodiment of the present invention.

FIG. 10 is a simplified cross-sectional diagram illustrating assembly 126 from the perspective of section lines 10—10 in FIG. 2 according to one embodiment of the present invention. Light beam 110 from light source 106 is directed onto surface 126A of assembly 126. As shown and described with respect to FIG. 9A, light beam 110 is scanned from one end of the surface 126A to an opposite end in one embodiment, in a direction parallel to the arrays 200 and 202. In one embodiment, light beam 110 is transmitted through substrate 310 of assembly 126, goes through the clear window 402 of scan array 202, and also strikes photosensors 710 of arrays 200A–200D.

The clear window 402, which is positioned between photosensor groups 400A and 400B, allows light beam 110 from light source 106 to pass through and illuminate a portion of media 130. The light that strikes media 130 is reflected onto photosensors 711, which capture image data for generating a digital representation of media 130. In one embodiment, photosensors 711 within scan array 202 capture image data during each scan pass of light source 106 (or 630). Metal layer 404 formed on photosensors 711 aids in preventing the photosensors 711 from being directly back illuminated by light source 106 (or 630). In one embodiment, scan array 202 is a one-to-one magnification imaging device, and scanning is performed in a manner similar to that of conventional flying dot scanners.

In one embodiment, scan array 202 is configured for black and white image scanning. In another embodiment, scan array 202 is configured for color scanning. In yet another embodiment, scan array 202 is configured for both color and black and white scanning.

Having the scanner functionality in assembly 126 also enables the detection of the leading edge and the two sides of the media that will receive the image. By simple geometry, the orientation and the width of the media are determined using the edge data. In this embodiment, to detect the two sides of a media, assembly 126 is slightly wider than the width of the media. Once the leading edge and the input skew are known, the raster file is digitally scaled, translated, and oriented for full edge-to-edge and top-to-bottom printing. Once the physical dimensions of the media are known, edge-to-edge printing is achieved by enlarging or reducing the image to achieve the optimal margin management condition. In one embodiment, the media transport mechanism provides for over-print zones around the edge of the media to allow full edge-to-edge and top-to-bottom printing.

As shown in FIG. 10, in addition to going through clear window 402, light beam 110 is transmitted through substrate 310 and illuminates photosensors 710 in fluid ejection arrays 200. Illuminated photosensors 710 generate a signal based on the sensed light, which, in one embodiment, is carried by electrode 933, and a corresponding current is sent through resistor material 926. The current through resistor material 926 causes fluid in nozzle chamber 910 to heat up and form a vapor bubble. The vapor bubble then ejects the fluid as a droplet through the orifice 904, and onto media 130.

The theory of operation of photosensors, such as photosensors 710 and 711, is known to those of ordinary skill in the art, and the basic operation is described in many textbooks on semiconductor physics. A few examples include: Introduction to Solid State Physics, by Charles Kittel, Seventh Edition, 1996, John Wiley & Sons, Inc.; Physics of Semiconductor Devices, by Michael Shur, 1990, Prentice-Hall, Inc.; Semiconductor Physics & Devices, by Donald A. Neamen, Second Edition, 1997, The McGraw-Hill Companies, Inc.

FIG. 11 is an electrical block diagram illustrating major electronic components of device 100 according to one embodiment of the present invention. Device 100 includes memory 602, fluid ejection arrays such as print arrays 200, scan array 202, image processor 610, multiplexer (MUX) 606, controller 612, light source driver 614, processor 616, the modulator 108, the light source 106, motor driver 618, transport motor 620, mirror motor 622, polygonal mirror 112, roller 140, encoders 621, 623, 624, and 626, read only memory (ROM) 628, and scanner light source 630. Device 100 also includes a clock for controlling system timing, which is not shown to simplify the illustration of device 100. In one embodiment, controller 612 is an application specific integrated circuit (ASIC) that performs most of the computationally intensive tasks of device 100, including device and memory control operations. In one embodiment, image processor 610 is also an ASIC. ROM 628 stores data for booting up and initializing controller 612 and processor 616, as well as other components within device 100. ROM 628 also stores color maps and look-up tables for image processor 610, and motor characteristics of motors 620 and 622.

During a normal fluid ejection job such as a print job, image data, text data, photographic data, or data of another format, is output from a host computer and/or other I/O devices to the controller 612 and is stored in memory 602. Controller 612 converts the received data into "dot data." Dot data as used herein means a data format corresponding to the dot pattern to be printed to achieve media markings corresponding to given input data. Dot data for a given activation element 700 is one bit having a first logic state indicating the activation element 700 is to fire fluid or a second logic state indicating the activation element 700 is not to fire fluid. The dot data defines lines of output dots.

Controller 612 outputs control signals to modulator 108 and light source driver 614 to control the operation of light source 106 based on the dot data, and thereby selectively activates various ejection elements 702 to eject fluid droplets. In one embodiment, modulator 108 acts as an electronic shutter to pulse light source 106 as its light beam is scanned across assembly 126 to selectively illuminate the desired photosensors 710 in assembly 126. According to one method for activating ejection elements 702 in fluid ejection arrays 200, the ejection elements 702 are initially disabled. The light source 106 is pulsed as its light beam 110 is scanned across assembly 126 to selectively illuminate the desired photosensors 710 in arrays 200. In one embodiment, illumination of a photosensor 710 causes ejection element 702 coupled to the photosensor 710 to be driven. The ejection element 702 causes fluid droplets to be fired. The ejection elements 702 are then disabled. The cycle then repeats until the print job is complete.

During manufacture of a PWA, some of the TIJ resistor layers may not be uniform throughout the array. If a TIJ resistor layer does not have the appropriate dimensions, it may not heat up as much as it should when fired, resulting in a "weak nozzle." There may also be other variations in the characteristics of the activation elements 700, including turn-on energies, operating voltages, currents, ejection directionality and impedances, as well as other variations.

In one embodiment, during the manufacturing and refilling process, various tests are performed on each activation element 700 in assembly 126, and data representing the characteristics of each activation element 700 are stored on an acumen on the array assembly and then loaded into ROM 628. During startup of device 100, controller 612 reads the characteristics data from ROM 628, and then modulates the light source 106 based on the stored data. For example, for activation elements 700 that are deemed to be "weak nozzles," controller 612 increases the amplitude and the pulse width of light source 106 for these activation elements 700, which increases the current through the ejection elements 702 for these activation elements 700, and/or causes a larger quantity of fluid to be ejected. Thus, in one embodiment, in addition to pulsing light source 106 to selectively activate ejection elements 702, the intensity and the pulse width of the light beam 110 from the light source 106 is varied on an activation element 700 by activation element 700 basis. This amplitude modulation changes the energy delivered to individual ejection elements 702, and provides a tool for drop volume control and half-toning improving features.

The amplitude, pulse width and shape of the scanning beam 110 can be tuned by modifying the driving function, and pulse width modulation of the electronic shutter. This tuning of the light beam 110 facilitates delivery of the appropriate turn-on-energy (TOE) for ejection elements 702, adds to the versatility of device 100, and enhances overall yield. In one form of the invention, the timing of the pulsing of light source 106 is also adjusted based on the stored characteristics data to control the position where the three micron wide light beam 110 strikes each thirty-nine micron wide photosite 710.

In one embodiment, the four fluid ejection arrays 200 are electronically multiplexed, with one of the arrays 200 being enabled at any given time. In one embodiment, after each scan pass of light source 106, controller 612 sends a control signal to multiplexer 606, which causes the currently enabled array 200 to be disabled, and the next appropriate array 200 to be enabled. In one embodiment, controller 612 determines the appropriate times to send control signals to multiplexer 606 by monitoring the dummy pixels 206 in arrays 200 and 202, which indicate when light beam 110 has completed a scan pass.

For image scanning operations in one embodiment, controller 612 sends a control signal to multiplexer 606 causing print arrays 200 to be disabled and scan array 202 to be enabled.

To perform the multiplexing according to one embodiment, the ground bus line 708 (shown in FIG. 5) of each array 200 is connected to a 3-bit analog multiplexer 606, which sets the ground bus line 708 to an open circuit for all arrays 200 except for a desired one of the arrays 200. For the arrays 200 that are set to an open circuit by multiplexer 606, no energy is delivered to the ejection elements 702 of those arrays 200. Firing energy is delivered to the ejection elements 702 for the array 200 that is not set to an open circuit, with the firing energy being delivered when the activation elements 700 within that array 200 are illuminated by light source 106. The same multiplexer 606 is also used to deactivate all of the arrays 200 when the scanning function is being performed.

Light source 630 is controlled by processor 616 during scanning. Raw image data is output from photosensors 711 in scan array 202 to image processor 610. In one embodiment, image processor 610 performs signal compensation operations, image enhancement operations, color balance operations, and other image processing operations on the raw image data to generate digital image data representing a scanned media. The digital image data is provided to controller 612.

In addition to controlling light source 630 during scanning, processor 616 also performs various high level operations within device 100, including monitoring flags and other status information, to assist controller 612 in controlling device 100. Controller 612 and processor 616 control motor driver 618, which provides motor drive signals to transport motor 620 and mirror motor 622. Transport motor 620 causes rollers 120, 124, 140, and 142, and star-wheel 128 to advance media through device 100. A single roller 140 is shown in FIG. 11 to simplify the illustration. Mirror motor 622 is coupled to polygonal mirror 112, and drives the mirror 112 at a substantially constant angular velocity.

The appropriate speeds of motion in device 100, such as the speed of transport of a media through device 100, are determined by the angular velocity of the rotating polygonal mirror 112. Variations and errors in the angular velocity of the polygonal mirror 112 result in dot placement errors on the media. In one embodiment, device 100 uses various forms of feedback and closed-loop control to attain optimal print quality. In one embodiment, the scanning light beam 110 and dummy pixels 206 on either end, or on both ends, of the assembly 126 are used by controller 612 to trigger timing and synchronization control signals to enhance print quality.

Since photosensors 710 and 711 in arrays 200 and 202 provide a signal when illuminated by scanning light beam 110, positional information on the location of the scanning light beam 110 is available. The positional information is used in a closed-loop fashion by controller 612 to control the angular velocity of polygonal mirror 112 and the timing of modulation of light source 106, in a manner similar to the way that encoder strips are used to time the pen firing and control the scan axis in conventional inkjet printers. Controller 612 uses the positional information to synchronize the timing of the modulation with the position of scanning light beam 110, and thereby generate a spatially accurate pulse train for triggering the pulsing of light source 106.

In one embodiment, dedicated photosensors (e.g., dummy pixels 206) are used to provide the positional information for synchronization and timing. In an alternative embodiment, the photosensors 710/711 used for triggering ejection elements 702 and/or for image scanning purposes are also used to identify the position of scanning light beam 110. If more accurate positional information is desired, the multiple arrays of photosensors 710/711 can be fabricated with an intentional positional mismatch to essentially create a solid state encoder that is similar to quadrature plates used in encoder sensors for conventional inkjet printers.

In one form of the invention, to provide further synchronization and timing accuracy, encoders 621, 623, 626, and 624 output signals that are used to determine positional and/or velocity information regarding motors 620 and 622, polygonal mirror 112, and one or more of rollers 120, 124, 140, and 142, and star-wheel 128, respectively. In one embodiment, encoders 621 and 624 output synchronization signals to motor driver 618 for the paper drive axis for better line advance accuracy, and encoders 623 and 626 output signals to motor driver 618 to indicate the position and/or velocity of mirror motor 622 and polygonal mirror 112, respectively.

In one embodiment, assembly 126 is configured to be interchangeable with other similarly configured assemblies, so that when assembly 126 runs out of fluid, the user can return the assembly 126 to an authorized facility and get another assembly 126 filled with fluid. The returned assembly 126 is then delivered to an authorized refill site. This refill process is similar to the process for refilling existing electrophotographic toner cartridges, and allows testing and calibration of assembly 126 to be performed after each refill cycle to ensure proper operation and to help prevent any performance degradation that might occur due to multiple fill cycles.

Embodiments of the present invention provide numerous advantages over prior PWA printhead assemblies. One embodiment of the present invention provides a method of triggering and driving inkjet elements in a PWA printhead assembly that minimizes the complexities and difficulties encountered with traditional methods of triggering and driving PWAs. One embodiment uses less complex electronics, provides greater head yield, and increased speed over previous PWAs. One form of the invention provides better throughput performance than existing PWA systems using low cost inkjet printing technology (thermal or piezoelectric). One embodiment provides a compact size printer with speed comparable to existing electrophotographic printers at a lower cost and a lower power usage. One embodiment provides a high-speed, high-end PWA system with multiple PWAs, and multiple writing lasers and mirrors for each PWA in order to speed up the throughput of the system. It will be readily apparent to persons of ordinary skill in the art that the techniques described herein may be applied to many different device configurations, including low and high end color (or black and white) printers, compact and non-compact printers, as well as other devices.

In one form of the invention, the basic architecture of the PWA and the support electronics are much less complex than existing PWAs due to the optical triggering. Eliminating the interconnects that carry firing signals to the ejection elements frees up additional space in the PWA, which may be used for other purposes, such as for the traces used for delivering power to the ejection elements. In addition to facilitating the optical trigging and image scanning, the use of a glass substrate provides numerous other advantages. Glass substrates generally cost less and have a greater availability than silicon wafer substrates. Because of the relatively low cost of glass, thicker and more robust PWAs may be cost-effectively formed using a glass substrate. A glass substrate, or other transparent substrate, allows metrology to be performed using visible light wavelengths. In addition, the glass manufacturing industry is well-established, and is capable of producing high-quality, optical grade glass, with tight size and surface roughness tolerances, in a cost-effective manner.

In one form of the present invention, a page-wide scanner array 202 is produced by the same processes as the fluid ejection arrays 200, thereby forming a monolithic input/output array. The added scanner functionality is realized without substantial cost in one embodiment, by using the illumination source that is already a part of the system for fluid ejection purposes. The combination of fluid ejection and scanning functionality in a single PWA assembly enables powerful products to be produced, including multi-function products (MFPs) combining printer, fax, copier, and scanner functions.

Since scan array 202 provides one-to-one magnification in one embodiment, the sensor sites can be made very large compared to conventional CCD (charge-coupled device) sensors, with orders of magnitude larger integration area. The larger integration area results in faster integration time, as well as better signal-to-noise ratios, and hence better dynamic range and scan quality. For example, a typical CCD sensor site's size is approximately 10 micrometers by 10 micrometers, whereas with the one-to-one magnification of scan array 202, the size of the sensor sites can be as large as 70 micrometers by 70 micrometers for 300 DPI resolution, yielding approximately 49 times the integration area.

In addition, since a scanning light source is used in one embodiment of the present invention, as opposed to the light sources in most low-cost, page-wide scanners available today that illuminate an entire page at a time, much more light can be concentrated on each individual photosensor 711 than is economically possible with such existing page-wide scanners. The existing low-cost, page-wide scanners illuminate the entire page with a fairly high lux level to achieve the desired scan speeds. With the higher concentrated scanning light source of one form of the invention, higher scanning speeds can be achieved.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A printhead assembly, comprising:

a plurality of ejection elements, each of the ejection elements configured to cause fluid to be ejected when the ejection element is activated;

a plurality of photosensors, each photosensor coupled to one of the ejection elements, each photosensor configured to cause the ejection element coupled to the photosensor to be activated when the photosensor is illuminated by a light source;

a plurality of amplifiers, each photosensor being coupled to one of the ejection elements via one of the amplifiers;

wherein each amplifier comprises a first and a second FET, each FET including a gate, a source, and a drain; and wherein each amplifier further comprises a latch, and wherein the latch of each amplifier is coupled between one of the photosensors and the gate of the first FET of the amplifier, and wherein the first FET of each amplifier is configured to be turned on when the photosensor coupled to the first FET via the latch is illuminated by the light source.

2. The printhead assembly of claim 1, wherein the second FET of each amplifier is coupled to the first FET of the amplifier and to one of the ejection elements, the second FET of each amplifier configured to provide a drive signal for activating the ejection element coupled to the second FET when the first FET of the amplifier is turned on.

3. A replaceable printer component comprising:

an array of fluid ejection elements, each of the fluid ejection elements configured to cause fluid to be ejected when the fluid ejection element is activated; and optical activation means for activating the fluid ejection elements based on a received light beam.

4. The replaceable printer component of claim 3, wherein the optical activation means comprises a plurality of photodiodes, with each photodiode being coupled to one of the fluid ejection elements.

5. The replaceable printer component of claim 3, wherein the optical activation means comprises a plurality of phototransistors, with each phototransistor being coupled to one of the fluid ejection elements.

6. The replaceable printer component of claim 3, wherein the optical activation means comprises a plurality of photosensors and amplification means coupled to the plurality of photosensors for outputting drive signals to the fluid ejection elements based on outputs of the photosensors.

7. The replaceable printer component of claim 3, wherein the array of fluid ejection elements is a page-wide-array of fluid ejection elements.

8. A method of firing fluid ejection elements of a printhead assembly, each of the fluid ejection elements causing fluid to be ejected when activated, the method comprising:

providing a plurality of photosensors, each photosensor coupled to a respective one of the fluid ejection elements;

generating activation signals when the photosensors are illuminated by a light source; and activating ejection elements in the printhead assembly based on the activation signals, thereby causing fluid to be ejected by the activated fluid ejection elements.

9. The method of claim 9, and further comprising:

latching the activation signals;

amplifying the latched activation signals; and activating fluid ejection elements in the printhead assembly based on the amplified activation signals.

10. The method of claim 8, wherein the printhead assembly is a page-wide-array printhead assembly.

11. A fluid ejection assembly comprising:

an array of fluid ejection elements, each of the fluid ejection elements causing fluid to be ejected from an associated nozzle chamber when activated; and optical activation means for activating the fluid ejection elements based on a received light beam.

12. A method of firing fluid from a fluid ejection assembly having a fluid ejection element and a photosensor coupled to the fluid ejection element, the method comprising:

generating an activation signal when the photosensor is illuminated by a light source; and activating the fluid ejection element in the fluid ejection assembly based on the activation signal, thereby causing fluid to be ejected by the activated fluid ejection element.

* * * * *